United States Patent [19]

van den Nieuwelaar et al.

[11] Patent Number: 5,549,521
[45] Date of Patent: Aug. 27, 1996

[54] METHOD AND DEVICE FOR PROCESSING A CLUSTER OF ORGANS FROM A SLAUGHTERED ANIMAL

[75] Inventors: Adrianus J. van den Nieuwelaar, Genert; Petrus C. M. Janssen, Wilbertoord; Engelbert J. J. Teurlinx, Stevensbeek; Cornelius D. van Harskamp, Boxmeer; Bastiaan W. J. E. J. Drabbels, Vierlingsbeek, all of Netherlands

[73] Assignee: Stork PMT B.V., Boxmeer, Netherlands

[21] Appl. No.: 118,979

[22] Filed: Sep. 9, 1993

[30] Foreign Application Priority Data

Sep. 10, 1992 [NL] Netherlands ............................. 9201574
May 12, 1993 [NL] Netherlands ............................. 9300815

[51] Int. Cl.⁶ ........................................................ A22C 21/06
[52] U.S. Cl. ........................................... 452/118; 452/117
[58] Field of Search ........................... 452/118, 117, 452/106, 109, 112

[56] References Cited

U.S. PATENT DOCUMENTS

| | | | |
|---|---|---|---|
| 3,879,803 | 4/1975 | Verbakel | 452/118 |
| 4,019,222 | 4/1977 | Scheier et al. | 452/118 |
| 4,035,867 | 7/1977 | Meyn | 452/167 |
| 4,063,331 | 12/1977 | O'Neal et al. | 452/106 |
| 4,262,387 | 4/1981 | Schieier et al. | 452/117 |
| 4,467,498 | 8/1984 | Graham et al. | 452/117 |
| 4,516,290 | 5/1985 | van Mil | 452/118 |
| 4,538,325 | 9/1985 | Harben, Jr. et al. | 17/45 |
| 4,561,148 | 12/1985 | Bonuchi et al. | 452/117 |
| 4,570,296 | 2/1986 | Hill et al. | 452/112 |
| 4,724,581 | 2/1988 | van de Niguwelaar | 452/118 |
| 4,788,749 | 12/1988 | Hazenbroek et al. | 452/117 |
| 5,098,333 | 3/1992 | Cobb | 452/117 |
| 5,186,679 | 2/1993 | Meyn | 452/117 |

FOREIGN PATENT DOCUMENTS

| | | | |
|---|---|---|---|
| 0487168 | 11/1990 | European Pat. Off. | A22C 21/06 |
| 0404235 | 12/1990 | European Pat. Off. | A22C 21/06 |
| 0439904 | 7/1991 | European Pat. Off. | A22C 17/14 |
| 0482700 | 4/1992 | European Pat. Off. | A22C 21/06 |
| 0538943 | 4/1993 | European Pat. Off. | A22C 21/06 |
| 0541150 | 5/1993 | European Pat. Off. | A22C 17/14 |
| 0530868 | 10/1993 | European Pat. Off. | A22C 21/06 |
| 3709869 | 10/1988 | Germany | A22C 21/06 |
| 1186965 | 7/1985 | Italy . | |
| 6-119219 | 3/1986 | Japan | A22C 021/06 |
| 7100142 | 7/1972 | Netherlands | A22C 21/06 |
| 7502569 | 7/1976 | Netherlands | A22C 21/00 |
| 7705225 | 11/1977 | Netherlands | A22C 17/14 |
| 8400506 | 9/1985 | Netherlands | A22C 21/06 |
| 9100153 | 8/1992 | Netherlands | A22C 21/06 |
| 9200599 | 10/1993 | Netherlands | A22C 21/06 |
| 322169 | 11/1971 | Russian Federation . | |
| 2004175 | 9/1979 | United Kingdom | A22C 21/06 |

OTHER PUBLICATIONS

"Hands-off Inspection Proving Processors' Utopia", by David Amey, Poultry Processing and Marketing, Jan. 1987 pp. 28–33.

"Hands-off Inspection", author unknown, Broiler Industry, Oct. 1977, pp. 67,69,78.

*Primary Examiner*—Willis Little
*Attorney, Agent, or Firm*—Deveau, Colton & Marquis

[57] ABSTRACT

Method and device for separating one or more organs or a part thereof from a cluster of interconnected internal organs from a slaughtered animal, making use of a fixing device which is moved through an evisceration opening into the body of the slaughtered animal, in which method a part of the cluster is fixed with the aid of and relative to the fixing device, the connection between the organs and the body is broken, and the organs are taken out of the body. The fixing is maintained after the organs have been taken out of the body and until a separating operation has been carried out on one or more organs or a part thereof in a spatial orientation determined by the fixing. The fixing is achieved by clamping a part of the cluster. During the fixing, organs can be separated from the cluster of organs with the aid of guide elements, stripping elements, separating rollers, and cutting elements.

38 Claims, 15 Drawing Sheets

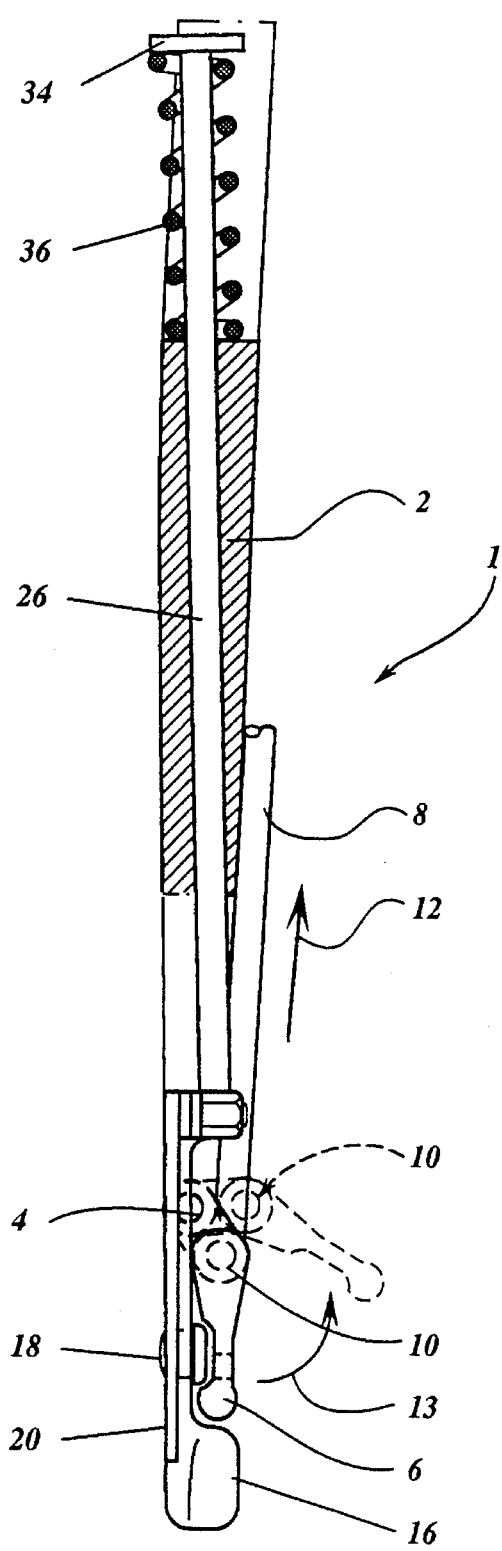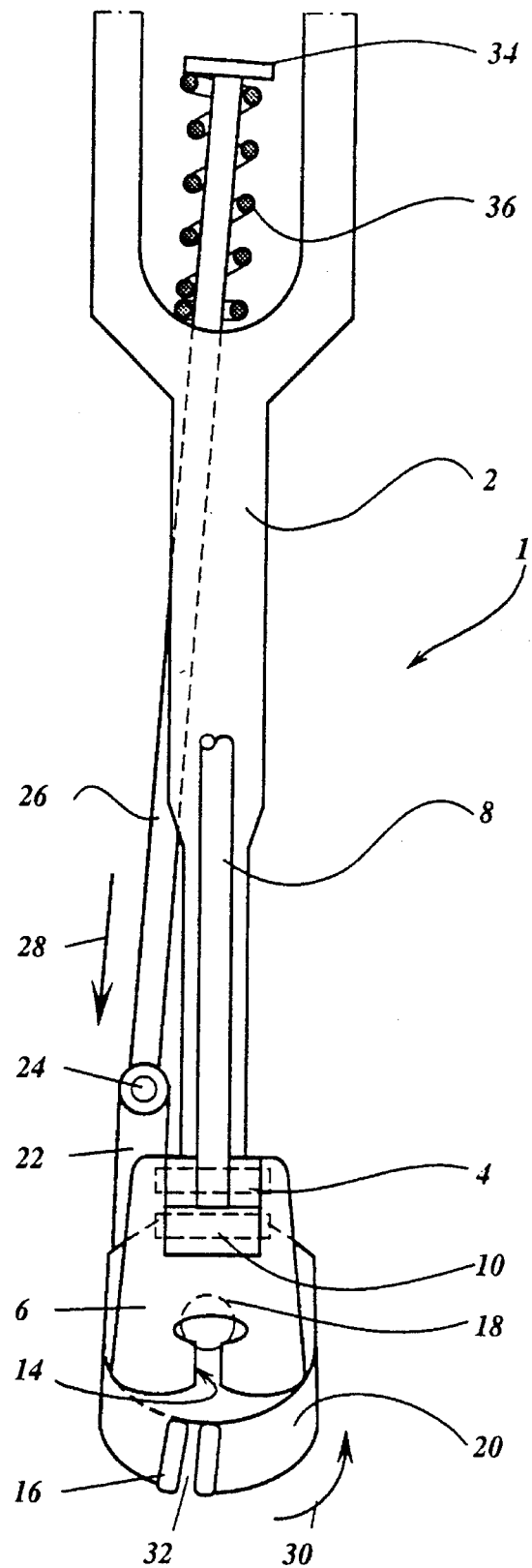
*Fig. 1a*  *Fig. 1b*

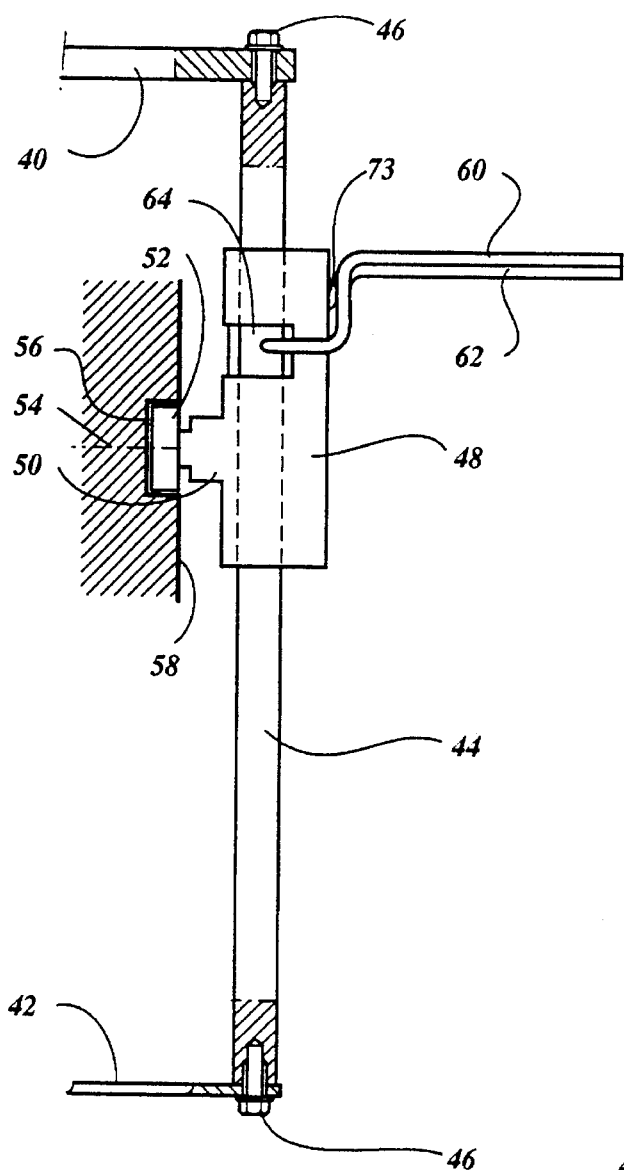
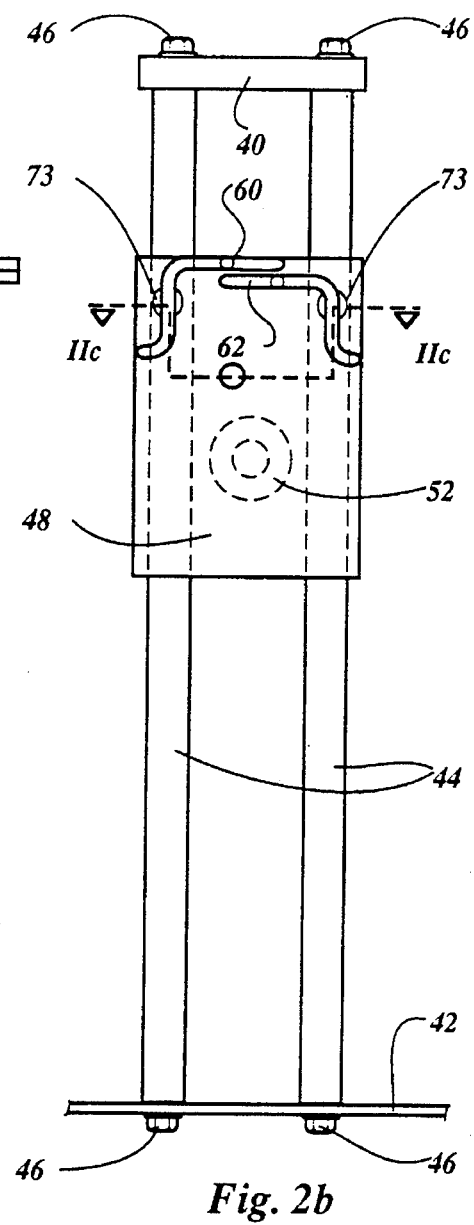
*Fig. 2a*  *Fig. 2b*
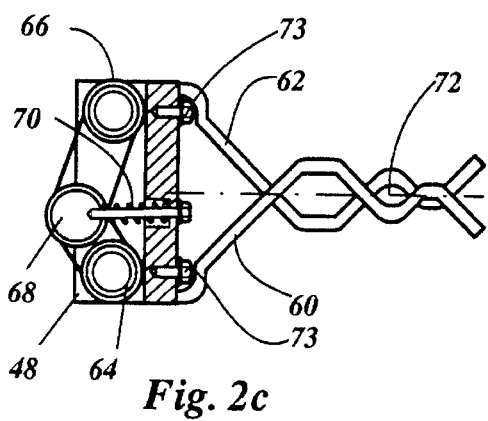
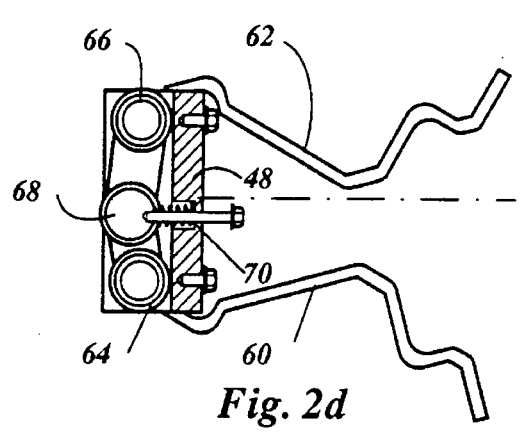
*Fig. 2c*  *Fig. 2d*

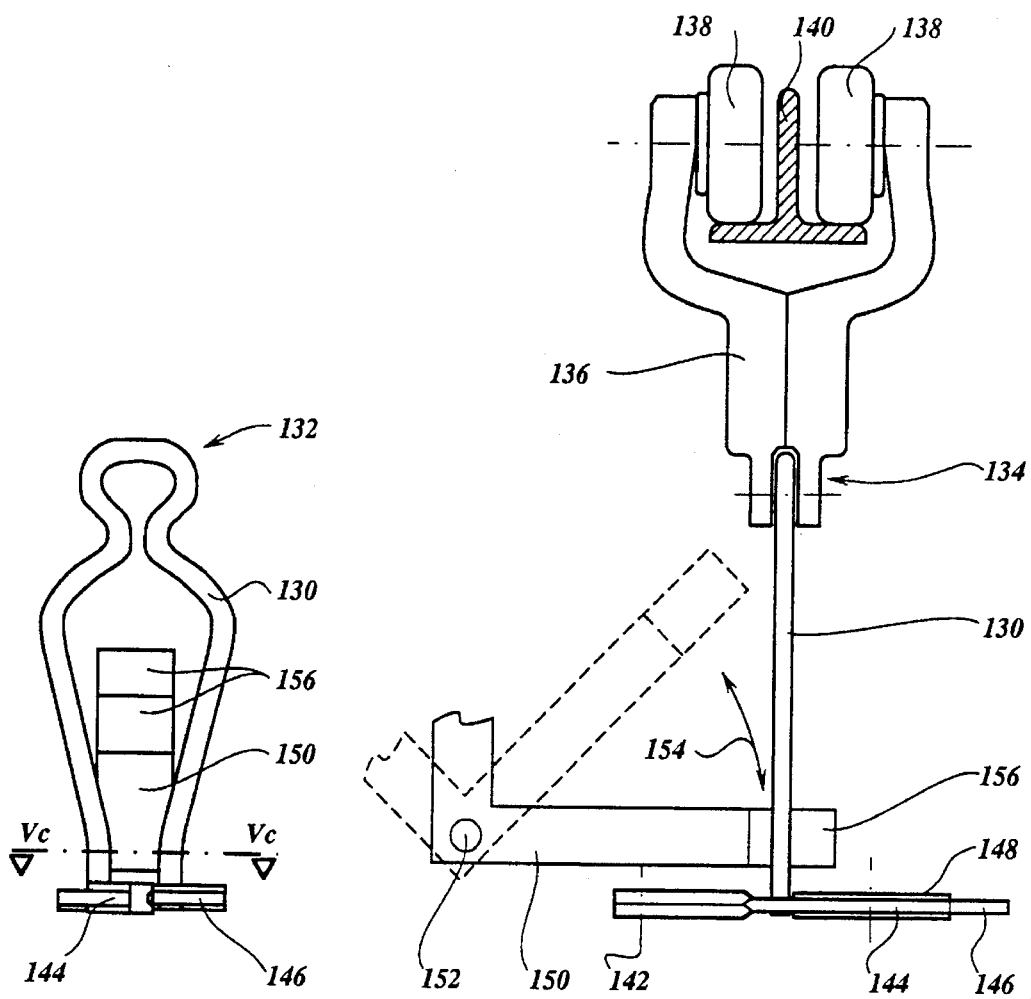
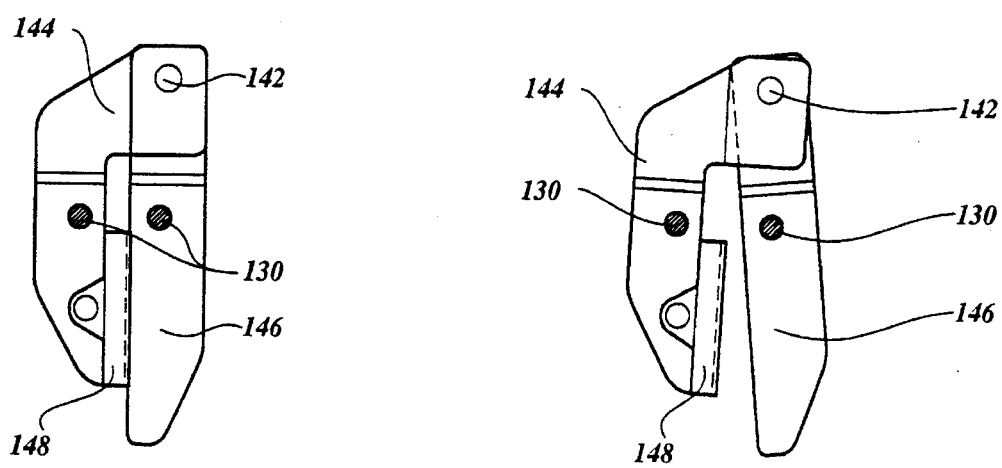
Fig. 5b
Fig. 5a
Fig. 5c
Fig. 5d

METHOD AND DEVICE FOR PROCESSING A CLUSTER OF ORGANS FROM A SLAUGHTERED ANIMAL

BACKGROUND OF THE INVENTION

This invention relates to a method for separating one or more organs or a part thereof from a cluster of interconnected internal organs of a slaughtered animal. The invention also relates to devices for carrying out the method according to the invention. "Slaughtered animals" should be understood hereinafter as meaning both, for example, poultry and other (large and small) livestock.

DISCUSSION OF THE PRIOR ART

U.S. Pat. No. 4,467,498, U.S. Pat. No. 4,561,148 and NL-A-9100153 describe methods for eviscerating slaughtered poultry. In these cases use is made of a fixing means which is inserted through a vent opening into the body of a slaughtered bird, grips the gullet—i.e. the connection between crop and glandular stomach—and then removes the part of the cluster of organs connected to the gullet at the glandular stomach side, together with the gullet, completely from the body of the bird, the gullet breaking off at the crop side.

Prior to the operation described in the above-mentioned U.S. patents, the cluster of organs has already been partially taken out of the body, with the aid of an evisceration means, following which the cluster of organs taken out of its natural position is hanging by the gullet, partially inside and partially outside the body. This creates space for introducing the fixing means into the body and moving the fixing means in the body in order to grip the gullet, which is essentially still in its natural position.

In this known method the cluster of organs is removed in two successive mechanical processing steps, namely first partially with the evisceration means and then completely with the fixing means.

In the device according to NL-A-9100153 a fixing means and an evisceration means are combined in a single construction, consisting of two C-shaped brackets which can be swivelled relative to each other, and with which a cluster of organs can be removed completely from a slaughtered bird in a single processing step. In this device also the cluster of organs is fixed by the fixing means at the gullet after the evisceration operation.

After the cluster of organs has been removed completely from the bird with the aid of the fixing means, said cluster is released from the grip of the fixing means onto a conveyor belt or other discharge means, for manually, or manually as well as mechanically, separating organs or a part thereof from the cluster.

A major drawback of the known methods and devices is that, after the cluster of organs is removed completely from the slaughtered animal with the aid of the fixing means, said cluster is discharged in an unordered way. The fact that various organs of value, for example the stomach, the heart and the liver, usually still have to be separated from the cluster, and the fact that this is preferably carried out mechanically are the very reason why it is necessary to have a certain ordering or orientation of the cluster of organs or individual organs thereof before organs can be separated mechanically from them, because there are no machines which can process a cluster of organs in a random orientation. In the prior art, an intermediate manual operation on the cluster of organs after the evisceration is therefore always necessary in order to produce the desired orientation for the separation processing.

SUMMARY OF THE INVENTION

The object of the present invention is in the first place to provide a method for feeding the cluster of organs in a predetermined way to the next processing station, following a known evisceration operation, during or following which at least one of the organs, a part thereof or a connection between the organs is fixed (secured) as known per se, when the part of the cluster to be fixed is still essentially in its natural position in the slaughtered animal.

To attain this object, the method according to the invention comprises the following steps: fixing of at least one of the organs, a part thereof or a connection between the organs when the cluster is in or partly out of the body of the slaughtered animal, taking the cluster out of the body, while maintaining the condition of fixing; and breaking one or more tissue connections in the cluster on the basis of the spatial orientation of the cluster determined by the condition of fixing thereof.

The fixing already produced by a fixing means, which could also be a human hand, is put to good use here for positioning the organs for subsequent operations, by not allowing said fixing to go directly to waste, as is the case in the prior art. Great advantage can be achieved with regard to a separating operation following the evisceration operation, i.e. separating organs or a part thereof from the cluster of organs. Here, either a specific organ, such as the heart, the liver or the stomach, can be used by the fixing means as a basis for the fixing during the removal of the cluster of organs, following which said organ or a part thereof can easily be separated (e.g. torn or cut off) from the rest of the cluster, on account of its known position relative to the fixing means, or the organ, for example the gullet, which is selected from the interconnected organs for fixing is such that connecting tissue in or between the organs can be broken leaving the remaining part of the cluster intact. It will be clear from the above that there is no need for an intermediate manual operation for an orientation of the organs for the purpose of a separating operation. This saves time and costs, and is beneficial for hygiene in the processing of slaughtered animals in the slaughterhouse.

In the method according to the invention a fixing of a part of a cluster is maintained until a separating operation has been carried out on the organs on the basis of a spatial orientation determined by the fixing. Although it is possible to use a fixing means which is moved first through an evisceration opening into the body of the slaughtered animal, for fixing a part of the cluster, and using the fixing subsequently for carrying out a separating operation, the same or similar fixing means can of course also be used advantageously when the cluster has already been taken out of the body of the slaughtered animal. In particular, such a method according to the invention comprises the following steps: taking the cluster out of the body of the slaughtered animal; fixing a strong organ and bringing the cluster in a spatial orientation which is determined by the way of fixing; and breaking tissue connections in the cluster on the basis of the spatial orientation of the cluster in the maintained condition of fixing. Here, the term "strong" refers to gullet, stomach (in the case of poultry: glandular stomach and gizzard), heart and kidneys.

The fixing according to the invention, once it is effected, is preferably used as long as possible. However, from the point of view of flexible running of the organ processing, it is advantageous to maintain the fixing by further fixing at least one of the organs, a part thereof or a connection between the organs which is in a predetermined position relative to the point or points of the first fixing, following which the first fixing is undone. The latter method can be used in particular when a separate evisceration device and separate devices for control, cleaning and separating operations are present, in all of which a cluster of organs is moved and positioned with the aid of a fixing means.

If, prior to or during evisceration, when the organs are essentially in their natural position in the body of the slaughtered animal, or at a later processing stage the cluster is fixed at at least two points lying at a distance from each other, this not only improves the stability of the fixing compared with the situation in which the fixing is effected at only one point, but also provides an adequate reference of the fixed organ or organs or a part thereof, particularly during the transfer of the cluster of organs from a first fixing means to a second fixing means, in order to ensure a faultless mechanical transfer of the cluster.

In a preferred embodiment of the inventive method the cluster is allowed to hang free from the point or points of fixing. Hereby the cluster partially unfolds, improving the access to the organs for the separating processing.

The fixing is preferably achieved by clamping the cluster part in question, but it is also possible to fix the cluster part in question by suction, or by accommodating the cluster part in question in an appropriate bounded space.

With a view to a separating operation to be carried out after an evisceration operation, the gullet, heart, liver, stomach and/or intestines are preferably fixed. These organs are not only easy to reach in the body of a slaughtered animal—the gullet, for example, in a manner which is known from the prior art, the stomach (where the slaughtered animal is a bird, the glandular stomach or the gizzard) and the liver, for example, by holding them by suction against the suction aperture of a suction nozzle by means of which the intestines or the intestines and the stomach of the slaughtered animal are sucked away previously, and the intestines, for example, by accommodating the vent in a bounded space—but also play a crucial role in the organ position determination in conventional organ cluster dividing devices.

Once a part of a cluster has been fixed according to the invention, the organs of the cluster, thereby assuming a defined spatial orientation, preferably are conveyed along a predetermined path to one or more processing stations for separating one or more organs or a part thereof from the cluster. A number of such processing stations is known per se, which stations can be easily adapted to receive an organ cluster fixed according to the invention.

A particularly simple separating operation results if the cluster is supported at least at one side, a pressure force is exerted opposite to the direction of support on tissue situated adjacent to an organ or organ part to be separated for causing the latter to bulge out, and the organ or organ part to be separated is separated from the remaining organs. This method is advantageous in particular if the organ to be separated is harder than the adjacent organs. The organ to be separated will project relative to the other organs when the method is being carried out, which makes the separating operation very easy. An example of an organ to be extracted in this way from a cluster of the organs of the slaughtered animal is the heart.

A further advantageous separating operation to be carried out for breaking the tissue connections in a cluster of internal organs removed from a slaughtered animal is effected by exerting a force on organs in a direction away from point or points of fixing. It has been found from experiments that in this way organs can be separated selectively from the remaining organs of a cluster, or can be moved without separating the organs completely from the remaining organs. This last possibility in particular is important, since organs can be positioned in this way relative to the point or points of fixing, and can subsequently be fed automatically with the aid of simple guides to organ cluster dividing devices or organ processing devices.

Preferably, from a cluster of organs comprising stomach, heart, lungs, liver, gall-bladder and intestines, first the intestines and the gall-bladder are separated, and then at least one of the other organs is separated. Consequently, the intestines and the gall-bladder, giving rise to the greatest risk of undesired contamination of the much more valuable organs like the heart and liver, are separated from the cluster as soon as possible.

A device for fixing according to the invention a part of a cluster of interconnected internal organs of a slaughtered animal comprises means for fixing at least one of the organs, a part thereof or a connection between the organs, the fixing means being adapted to move through an evisceration opening into the body of the slaughtered animal, to fix a part of the cluster relative to the fixing means; and evisceration means designed to interact with the fixing means for taking the cluster out of the body, the evisceration means comprising a tiltable scoop. Such evisceration means are known, for example from NL-A-8400506, but have never before been used in conjunction with fixing means or with separation of organs.

In a preferred embodiment, the evisceration means comprise a scoop which is disposed near one end of an elongated carrier and can be swung about an axis which is essentially at right angles to the longitudinal axis of the carrier, the fixing means comprising two jaw parts which are fitted near the end of the carrier and are movable relative to each other in a controllable manner for clamping a part of the cluster between them. Fixing means and evisceration means can be taken into the body of the slaughtered animal by means of a suitable drive with a mutually synchronised movement, for the purpose of fixing the organs in question prior to or during an evisceration operation.

In a special embodiment of the device, which is specifically suitable for fixing at the position of the gullet, the scoop is provided with a slit for accommodating the gullet, the jaw parts of the fixing means defining a similar slit in line with the scoop slit and at a distance from the scoop. It is, in addition, also possible for the combination of the jaw parts of the fixing means to form the scoop itself. Of course, the jaw parts in this case can be swung about an axis which is essentially at right angles to the longitudinal axis of the carrier.

It should be pointed out that the fixing means which is designed to interact with an evisceration means when the organs are being taken out of the body, can also be designed to hold the organs in question or a part thereof against it by suction, although this is considered a less reliable option than mechanically fixing a cluster. The fixing means in the case of suction preferably is hollow and comprises one or more apertures, and can be placed under vacuum in a controllable way, for the purpose of holding one or more organs in or against an aperture by suction. Such a fixing means is described in, for example, NL-A-9002551, in which a selected organ, for example the stomach or the liver, can be fixed relative to the fixing means in the body of a slaughtered animal by holding by suction. However, this prior art device acts on organs taken one by one from the belly cavity of a slaughtered animal, whereas the device according to the invention acts on a cluster of organs, which facilitates separation operations. In addition, according to the invention organs free from any connecting tissue can be obtained.

The fixing means which is designed to interact with an evisceration means when the organs are being taken out of the body can also be designed to accommodate the organs in question or a part thereof in a space determined by the fixing means. In this case the fixing means used is, for example, a device for cutting out the vent of the slaughtered animal, of the type described in NL-A-9000782.

A device according to the invention which is intended to carry out the methods according to the invention comprises fixing means which are part of a conveyor system to feed the organs of the cluster along a predetermined path and in a certain spatial orientation to a processing station for separating at least one organ or a part thereof from the cluster. The fixing means are, for example, moved in synchronism with the body of the slaughtered animal along a guide in a conveyor, the path of the body and the path of the fixing means diverging from each other following the removal of the cluster of organs from the slaughtered animal. The fixing means with the cluster of organs move to a processing station for a separating operation. The fixing means can be designed in a conventional way, but it is preferably of a design such as that described in greater detail below.

If desired, for the purpose of maintaining the fixing of the cluster of organs along the path, the fixing means comprise a first and a second fixing means, the second fixing means being provided along the path of the first fixing means, and being designed to take over the cluster from the first fixing means.

In a preferred embodiment, the second fixing means comprises two jaw parts which are movable in a controllable way relative to each other for clamping a part of the cluster between them, the jaw parts preferably being biased towards each other.

A very simple and efficient second fixing means is obtained if the jaw parts are disposed at the end of the legs of an essentially U-shaped spring bracket interacting with a spreader for moving the jaw parts apart. A suitable choice of the pre-tension in the spring bracket ensures that the organ or organ part to be clamped is always clamped tightly between the jaw parts with the necessary clamping force, so that, on the one hand, adequate fixing is produced and, on the other hand, little or no damage to the fixed organs occurs. The organs thus can be conveyed by a conveyor to a processing station.

If the jaw parts of the second fixing means are designed in such a way that one jaw part is provided with an elongated narrow side at the side facing the other jaw part, and the other jaw part is provided with an elongated narrow slit for accommodating the narrow side of the first jaw part, loss of fixing of an organ is effectively prevented.

An advantageous embodiment of the device for carrying out the method according to the invention comprises fixing means which are adapted to be conveyed along a path, and separating means having a support guide extending essentially parallel to the path of the fixing means, at a distance from which and parallel to which two guide elements bounding a guide slit extend, the guide elements and the support guide being situated for guiding the cluster at opposite sides, while a separating element is designed for operation across the guide slit. In the first place, the support guide, which may be a surface, which can be either vertical or at an angle to a vertical, produces a certain orientation of the cluster of organs, which orientation, with an suitable choice of run-in parts of the support guide and the guide elements interacting therewith, ensures that an organ to be separated finishes up at the side of the guide slit facing away from the support guide by the conveyance of the cluster by the fixing means, the remaining organs finishing up at the other side of the guide slit. If provision is made for the width of the guide slit to be at least locally smaller than the corresponding dimensions of the organ to be separated, said organ will not be able to pass through the guide slit. Moreover, the distance between the support guide and the guide elements can be selected in such a way that the organs lying between them are compressed to a certain extent. This is advantageous in particular if the organ to be separated is harder than the adjacent organs, since this means that the organ to be separated projects and can consequently be conveyed easily by the guide elements to the correct side of the guide slit. When this has been achieved, the organ is separated from the remainder of the organs by the conveyance of the cluster along the separating element extending across the guide slit.

In another preferred embodiment, means for separating comprise one or more stripping means which at least partially bound one or more passage areas, and are adapted to move jointly relative to a part of the cluster while exerting a force on organs for breaking tissue connections in the cluster in a fixed condition, the stripping means comprising stripping elements which are movable relative to each other, and the edges of which facing each other are adapted to bound at least one passage area. The edges of the stripping elements defining a passage area are adapted in size, shape and finish to the organs to be allowed through, while other organs are conveyed along by the stripping elements, and tissue connections between organs are broken near the edges of the stripping elements. The stripping elements are advantageously plate-shaped, but may also be elongated and bent in such a zigzag shape that in a position overlapping each other, the elements determine apertures of different dimensions. The stripping means may be adapted to move jointly relative to means for fixing or other means for retaining part of the cluster.

When the fixing means e.g. fixes the gullet of a cluster of organs, and suitably shaped stripping means are moved from the gullet along the cluster of organs, this will result in the stomach or stomachs passing the passage areas of the stripping means, but also in the organs surrounding the stomach or stomachs, such as heart, liver, lungs etc., being separated at least partially from the cluster of organs. When such a method is applied to the cluster of organs of a bird, and the stripping means are moved at least so far over the cluster of organs that the tissue connections between the interconnected glandular stomach and gizzard, on the one hand, and the other organs, on the other, are broken, except for a single connection by means of the part of the intestines which connects to the stomach (and in addition possibly by means of the pancreas and membranes), the cluster of organs hanging by the gullet can, with the aid of simple guides, fully automatically by the fixing means be fed to and processed in a device for separating liver, heart and lungs from the cluster of organs. Such a device is known, for example, from NL-A-9002287.

In another preferred embodiment, means for fixing are adapted to be conveyed along a path, and the stripping means comprise two elongated parallel elements, the edges of which face each other, and partially bound a passage area in the form of a guide slit extending at an angle to the path of the fixing means. Such stripping means, the guide elements e.g. being plate-shaped, can perform their function completely without any moving parts.

It is advantageous if the stripping means are designed in such a way that the stripping elements or guide elements are driven towards each other under pre-tension, for example produced by a mechanical or pneumatic spring. This means that, with a suitable choice of the spring pre-tensioning, the stripping means can to a certain extent automatically follow the contours of the organs to be allowed through, so that maximum effect is achieved without the risk of organ damage. The risk of damage can be reduced even further by making the stripping elements or guide elements from a flexible and resilient material.

According to the invention, a device for separating intestines from a cluster of interconnected intestines, gall-bladder and other internal organs, the cluster being fixed at at least one of the other organs, a part thereof or a connection between the organs, comprises separating means for breaking one or more tissue connections in the cluster, and having at least one pair of elongated, essentially parallel rollers which are adapted to be rotated in opposite directions to each other, and which rollers are each provided on the outside surface thereof with means for exerting a pulling force on the intestines away from the rest of the cluster.

If the pulling force exerted by the rollers is great enough, the rectum and the intestines connected thereto will break off from the rest of the cluster. The intestines can, however, also be separated by cutting off or pinching off the intestines at a predetermined place. In this way, the unusable intestines can already be separated at an early stage, preferably prior to any processing operation with the afore-mentioned stripping means, from the remaining, generally usable and valuable organs.

The gall-bladder can be separated from the cluster of organs at the same time as the intestines if organ guide means are fitted at the side of the separating means facing the point or points of fixing of the cluster, which organ guide means are adapted to orientate the cluster and partially bound a passage area which is large enough to allow the intestines and the gall-bladder through, but is too small to allow adjacent organs to pass. In experiments it was found that when a pulling force is exerted on the intestines, the gall-bladder together with the intestines is displaced, and can thus be taken into a predetermined position relative to the organ guide means. Both intestines and gall-bladder can then be separated from the other organs.

A separating element for breaking the tissue connection between the gall-bladder and the cluster is designed for operation across the guide slit.

In a preferred embodiment, adjacent to the separating element a vacuum tube is provided, having a suction aperture positioned and adapted to remove the gallbladder separated by the separating element.

For pulling the intestines through the guide slit leading to the rollers, one of the rollers of a pair may be provided with a helical rib, and the other is provided with a groove formed complementarily to the rib, and the rollers are rotatably connected to each other in such a way that the rib falls into the groove between the rollers. It is, however, also possible to provide both rollers of a pair with interacting helical or other elongated, preferably flexible ribs.

In a cluster of organs removed from the body of a slaughtered animal, the intestines form a rather compact bundle. To process such a bundle with the rollers of the device according to the invention under circumstances may cause difficulties in pulling the intestines in the nip between the rollers. Such difficulties can be avoided effectively, when the bundle of intestines is unfolded first before being fed to the rollers. For this purpose, a pair of rollers is provided each having along a part of its length axially and radially extending flaps made of a resilient material, which flaps are capable of stretching the intestines and thereby reducing the dimension of the bundle of intestines.

The claims and advantages will be more readily appreciated as the same becomes better understood by reference to the following detailed description and considered in connection with the accompanying drawings in which like reference symbols designate like parts.

BRIEF DESCRIPTION OF THE DRAWINGS

FIG. 1a shows a side view, partially in cross-section, of a preferred embodiment of an evisceration and fixing means according to the invention;

FIG. 1b shows a front view of the evisceration and fixing means of FIG. 1a;

FIG. 2a shows a side view, partially in cross-section, of a part of a preferred embodiment of a stripping means according to the invention;

FIG. 2b shows a front view of the stripping means of FIG. 2a;

FIG. 2c shows a top view, partially in cross-section along the line 11c—11c in FIG. 2b, of a part of the stripping means shown in FIG. 2a, in a closed position;

FIG. 2d in view similar to that of FIG. 2c shows the stripping means in an open position;

FIG. 5a shows a side view, partially in cross-section, of a fixing means;

FIG. 5b shows a front view of the fixing means of FIG. 5a;

FIG. 5c shows a top view of a clamping means in the closed position of the fixing means according to FIGS. 5a and 5b, partially in cross-section along the line Vc—Vc in FIG. 5b;

FIG. 5d shows the clamping means of FIG. 5c in the open position;

FIG. 7b illustrates an operation to be carried out on a cluster of organs with the separating means of FIG. 7a;

DESCRIPTION OF THE PREFERRED EMBODIMENTS

Figure 3A:
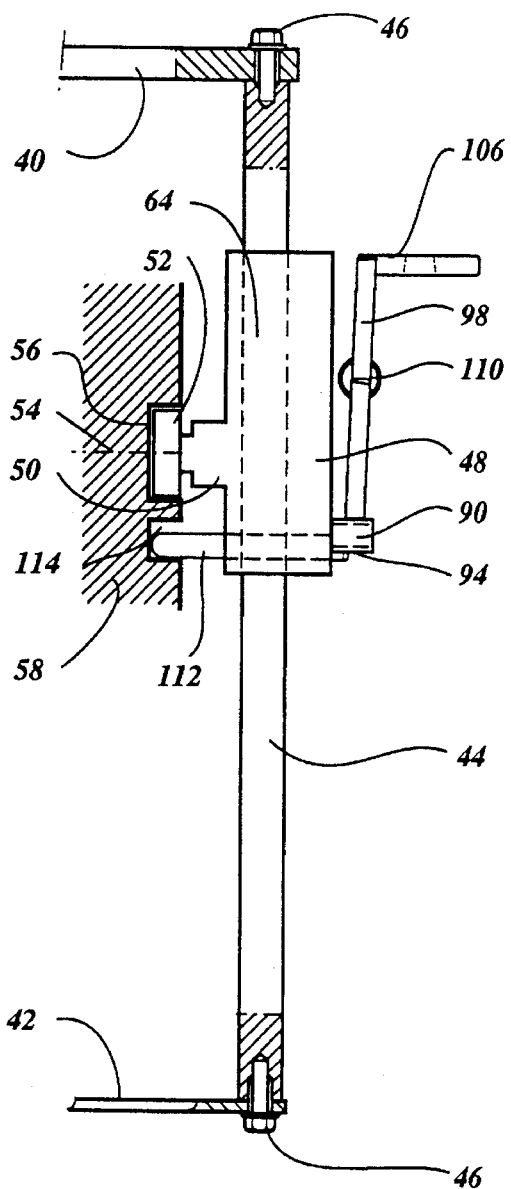
FIGS. 3a–3c show views corresponding to FIGS. 2a–2c of a second embodiment of a stripping means according to the invention.

In the construction shown in FIGS. 1a and 1b an evisceration means and a fixing means are combined to form an evisceration and fixing means 1. The evisceration means is known per se from NL-A-8400506, and comprises an elongated carrier 2, at one end of which a scoop 6 is fixed so that it pivots about a shaft 4. An evisceration operating rod 8 is pivotally fixed to the scoop 6 by means of a shaft 10, in such a way that when the evisceration operating rod 8 is moved in the direction of arrow 12 the scoop 6 swings in the direction of the arrow 13—from the position shown by a solid line in FIG. 1a to the position shown by a dashed line in the same figure. The scoop 6 is provided with a longitudinal slit 14, which widens towards the centre of the scoop 6.

According to the invention, a fixing means is added to the conventional evisceration scoop. Said fixing means comprises a first clamping part 16 which is fixed at the abovementioned end of the elongated carrier 2, and a second clamping part 20 which is hingedly connected thereto by means of a shaft 18. At the side facing the carrier 2, the second clamping part 20 is provided with an arm 22 which is hingedly connected by means of a shaft 24 to a fixing operating rod 26. Moving the fixing operating rod 26 in the direction of the arrow 30 causes the second clamping part 20 to swing in the direction of the arrow 30, with the result that a clamping slit 32 between the first clamping part 16 and the second clamping part 20 widens. A shoulder 34 provided at the end of the fixing operating rod 26 facing away from the scoop 6 and a compression spring 36 interacting therewith ensure that the second clamping part 20 always returns to the position shown in FIG. 1b when no force is exerted on the fixing operating rod 26 in the direction of arrow 28. The spring 36 determines the force which is necessary for enlargement of the clamping slit 32, or—in other words—determines the force with which the second clamping part 20 is pushed towards the first clamping part 16 at the position of the clamping slit 32.

Figure 4A:
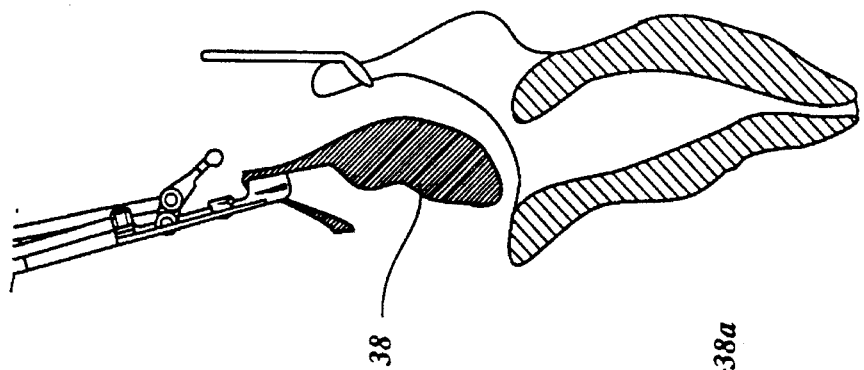
FIGS. 4a–4d illustrate diagrammatically the removal of a cluster of organs from a slaughtered animal with the aid of an evisceration and fixing means according to FIGS. 1a and 1b.
Figure 4B:
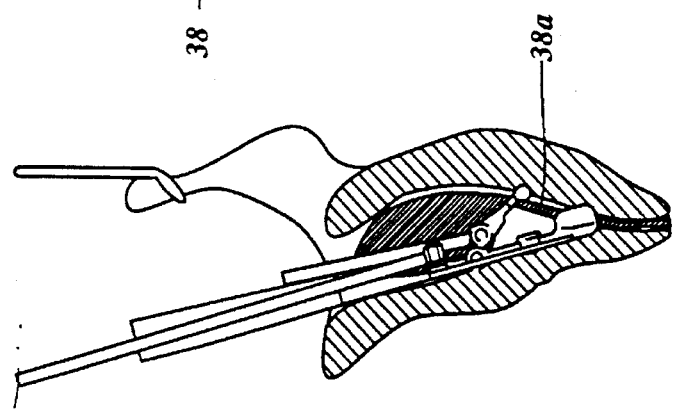
Figure 4C:
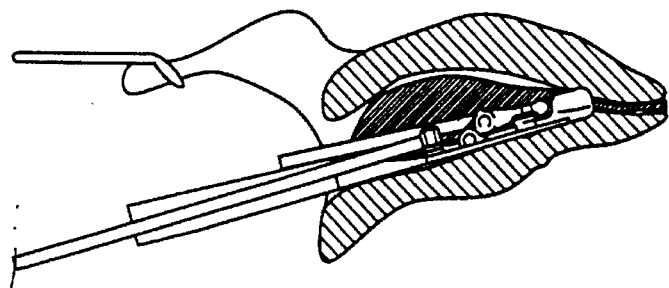
Figure 4D:
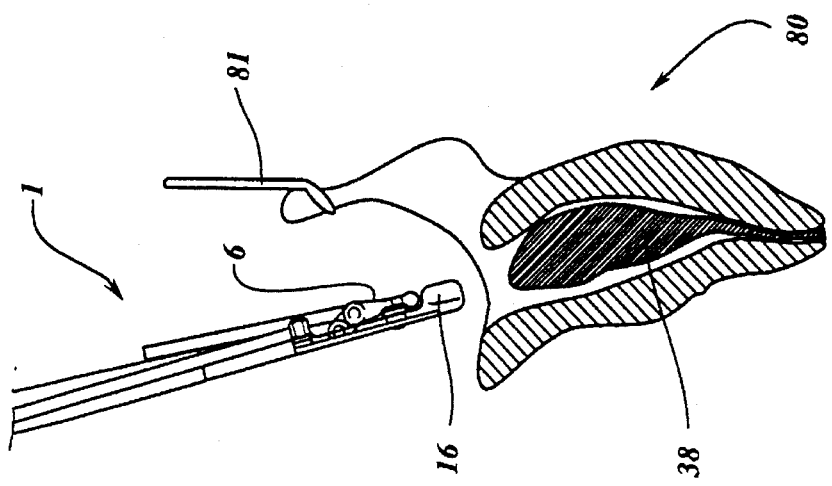

In use, as FIGS. 1a, 1b, 4a and 4b illustrate, the evisceration and fixing means 1 shown in FIGS. 1a and 1b is moved in the position shown by solid lines in the last-mentioned figures into the body of a slaughtered animal, for example a slaughtered bird 80 hanging by the legs from a hook 81, through an evisceration opening in the body in the region of the vent. In this case the scoop 6 will have to be capable of reaching past the major part of the organ cluster to the vicinity of the neck of the slaughtered animal, as illustrated in FIG. 4b. The neck region may be reached along the back side of the carcass, as shown in the figures, or along the front side thereof. When the scoop 6 has reached this position, operating the fixing operating rod 26 in the direction of the arrow 28 causes the clamping slit 32 to widen, and the scoop 6 is swung over in the direction of the arrow 13 by a movement of the evisceration operating rod 8 in the direction of the arrow 12. The result of this is that the gullet 38a of the slaughtered animal comes to lie both in the widened clamping slit 32 and in the longitudinal slit 14 of the scoop 6. The force exerted on the fixing operating rod 26 in the direction of the arrow 28 is then removed, so that as a result of the action of the compression spring 36 the second clamping part 20 moves relative to the first clamping part 16 in such a way that the clamping slit 32 is narrowed. The gullet 38a present in the clamping slit 32 is consequently fixed relative to the two clamping parts 16 and 20. This is illustrated in FIG. 4c. The next step is to move the evisceration and fixing means 1 out of the slaughtered animal in the lengthwise direction of the carrier 2, with the result that the gullet breaks off at the side of the clamping slit 32 facing away from the carrier 2 and the scoop 6 removes the cluster of organs 38 situated at the level of the carrier 2 from the body of the slaughtered animal. The fixing of the gullet in the clamping slit 32 is retained during this process.

FIGS. 2a–2d show views of a stripping means which is suitable for moving both along a straight (vertical) line and along a curved, for example circular, path. The stripping means comprises a top supporting plate 40 and a bottom supporting plate 42, between which a number of pairs of essentially vertically directed, mutually parallel guide rods 44 are fixed by means of bolts 46.

A bearing block 48 can slide along the guide rods 44 through being provided with holes and bearings on the guide rods 44. The bearing block 48 is provided with a laterally projecting cam 50, on which a guide wheel 52 is mounted in such a way that it rotates about an axis 54. Said guide wheel 52 is guided in a curved track 56 in a control part 58, in such a way that on displacement of the combination of the top supporting plate 40, the bottom supporting plate 42 and the guide rods 44 the bearing block 48 carries out a desired movement along the guide rods 44.

As can be seen most clearly from FIGS. 2c and 2d, two elongated stripping elements 60 and 62 are provided on the bearing block 48 in such a way that at one end thereof they pivot about bushes 64 and 66 respectively. The stripping elements 60 and 62 are a special curved shape and can assume either a position relative to each other in which they partially overlap—a so-called closed position shown in FIG. 2c—or a position in which a certain space exists between the two elements—a so-called open position shown in FIG. 2d. For this purpose, the bushes 64 and 66 of the stripping elements 60 and 62 are each mechanically connected to a control element 60, which can be moved relative to the bearing block 48 in a plane at right angles to the bushes 64 and 66. When the control element 68 is forced against the action of a compression spring 70 out of the position shown in FIG. 2c by a force in the direction of the bearing block 48, the bushes 64 and 66 pivot through a small angle in opposite directions to each other, with the result that the stripping elements go into the open position shown in FIG. 2d. When the abovementioned force is removed, the stripping elements assume the closed position again through the action of the compression spring 70.

In the position of the stripping elements 60 and 62 shown in FIG. 2c a stripping aperture 72 is determined through the shape of said elements. Said aperture 72 can be set by means of set screws 73, the head of which serves as a stop for the stripping elements 60 and 62.

The stripping elements in their closed position, in which they enclose a part of a cluster of organs in the stripping aperture 72, can sweep along the cluster of organs if the cluster of organs is set up in a fixed position relative to the guide rods 44 and the stripping elements 60, 62 are moved along the guide rods 44 by means of the earlier discussed curved track control.

Figure 3B:
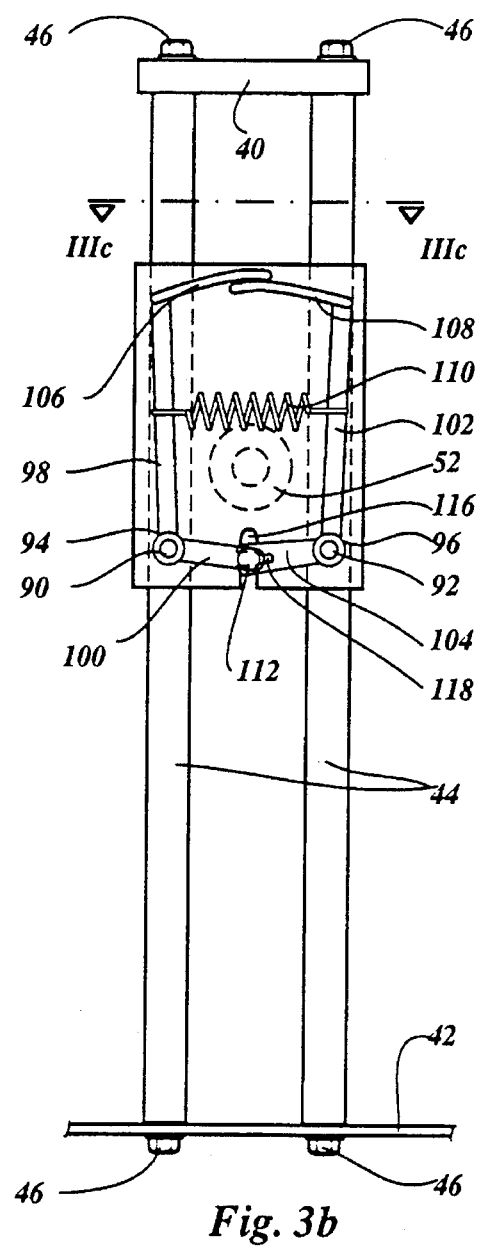
Figure 3C:
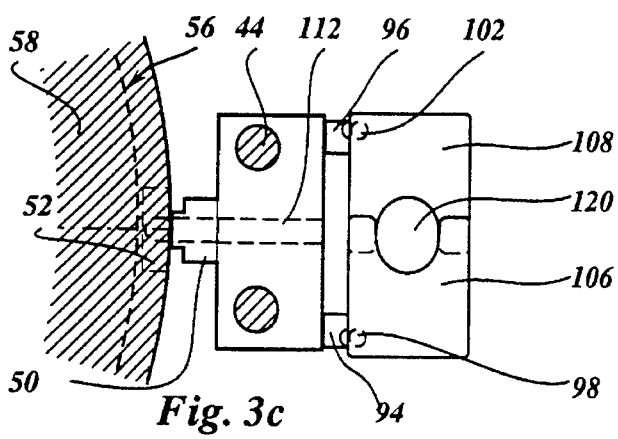

The stripping means shown in FIGS. 3a–3c differs from the stripping means shown in FIGS. 2a–2d only in the shape and the control of the stripping elements. The description of the stripping means according to FIGS. 3a–3c will therefore be limited here to the stripping elements and the way in which they are operated.

Two pins 90 and 92 are fixed on the bearing block 48 which is slidable along the guide rods 44, near the lower corner points thereof, on which pins bushes 94 and 96 respectively are rotatably mounted. An arm 98 and a control lever 100 are immovably connected to bush 94. An arm 102 and a control lever 104 are rigidly connected to the bush 96. A stripping element 106 is fixed at the end of the arm 98 facing away from the bush 94, while a stripping element 108 is fixed at the end of the arm 102 facing away from the bush 96. The arms 98 and 102 are interconnected by means of a pre-tensioned tension spring 110. The control lever 100 is rigidly connected to an elongated control pin 112, which extends into a curved track 114 of the control part 58. At the position of the control pin, the bearing block 48 is provided with a slit 116, by means of which the control pin 112 can move up and down while following the curved track 114. In this case the control lever 100 rigidly connected to the control pin 112 will ensure that the stripping element 106 moves essentially in the plane thereof. The control lever 104 is provided at the end thereof facing away from the bush 96 with an elongated slit 118, which serves to accommodate the control pin 112. A movement of the control pin 112 in the slit 116 thus produces a movement of both the control lever 100 and the control lever 104, with the result that the stripping elements 106 and 108 will move away from or towards each other and thereby assume an open or closed position.

FIG. 3c shows the closed position of the stripping elements 106 and 108, a passage 120 determined by recesses in the stripping elements 106 and 108 being clearly visible.

Figure 4E:
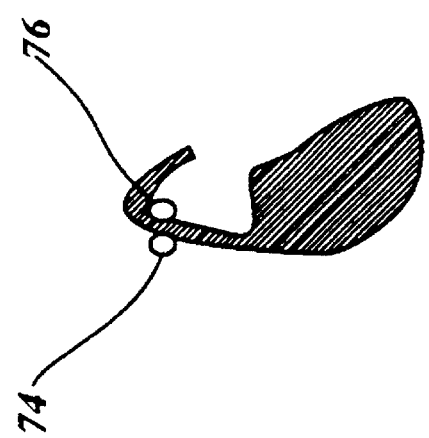
FIGS. 4e–4g illustrate diagrammatically the transfer of a cluster of organs from the evisceration and fixing means according to FIGS. 1a and 1b to a second fixing means.
Figure 4F:
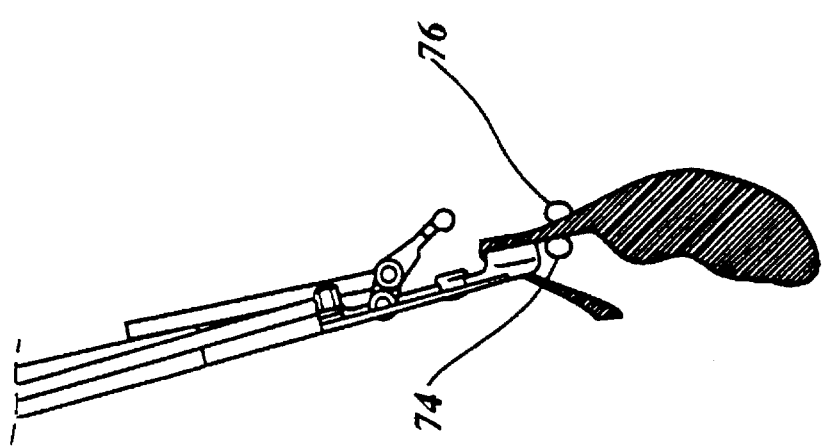
Figure 4G:
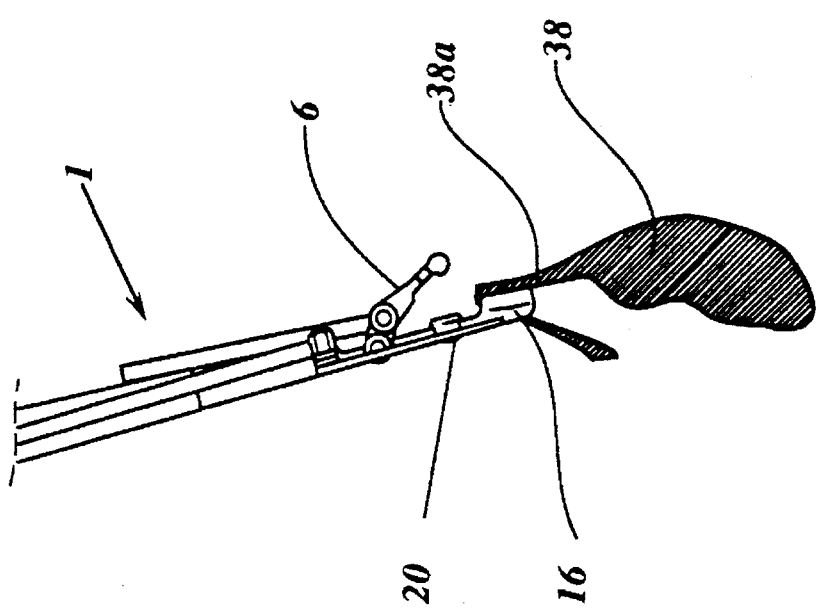
Figure 4J:
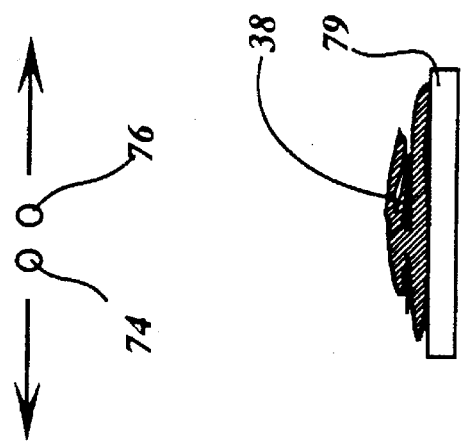
FIGS. 4h–4j illustrate diagrammatically the separating of organs from a cluster of organs with the aid of a stripping means.
Figure 4I:
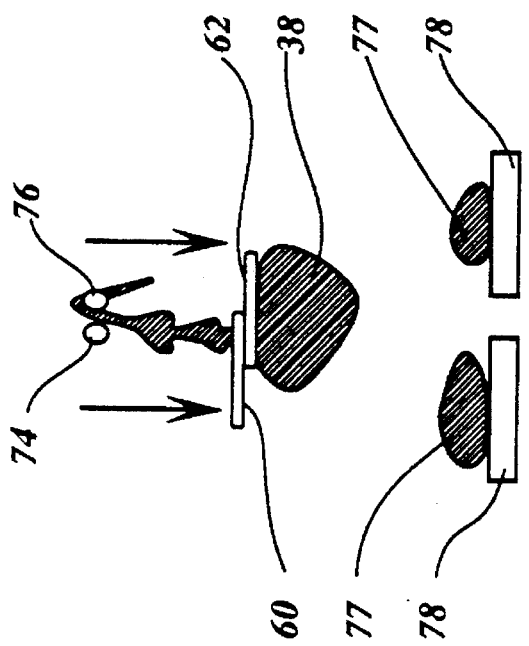
Figure 4H:
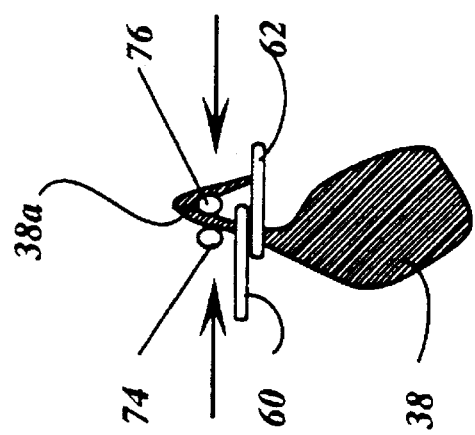

FIGS. 4h and 4l illustrate a stripping operation, in which, by way of example, the stripping elements 60 and 62 are shown only diagrammatically. The plate-shaped stripping elements 106 and 108 can also be used. The cluster of organs 38 is fixed at the gullet 38a thereof by clamping between two clamping elements 74 and 76.

As FIG. 4h shows, the stripping elements 60 and 62 are taken into the closed position first of all. The stripping elements are then (see FIG. 4i) moved jointly down in a direction away from the clamping elements 74 and 76, the clamping elements not being moved. Consequently, a force is exerted on organs in the cluster 38, by which force tissue connections are broken. The organs 77, such as the lungs, the heart or the like, stripped away from the cluster of organs as a result of this stripping operation, are collected on conveyor belts 78 and discharged for further processing.

On completion of the stripping operation, the clamping elements 74 and 76 are moved apart, as a result of which the fixing of the cluster of organs 38 stripped away is lost. The remainder of the cluster of organs 38 is collected on a conveyor belt 79 and discharged for further processing. This is illustrated in FIG. 4j.

If the device for carrying out the operations (evisceration and fixing) shown in FIGS. 4a–4d is different from the device for carrying out the operations (stripping of organs) shown in FIGS. 4h–4j, a mechanical transfer operation between the first-mentioned and last-mentioned operations is necessary. This transfer operation is illustrated in FIGS. 4e–4g. Starting from the situation reached in FIG. 4d, the cluster of organs 38 is conveyed away from the slaughtered animal 80. It can be seen clearly in FIG. 4e that a part of the gullet 38a is situated at a predetermined position under the clamping slit 32, where it is clamped between the clamping parts 16 and 20. This precise positioning means that the part of the gullet in question can be fixed securely and reliably between the clamping elements 74 and 76, as FIG. 4f shows. After this, the fixing by the evisceration and fixing element 1 is no longer necessary, as FIG. 4g illustrates.

The function of the clamping elements 74 and 76 shown in FIGS. 4f–4j can be carried out by a fixing means shown in detail in FIGS. 5a–5d. This fixing means comprises an essentially U-shaped bracket 130, which is provided with an integral suspension eye 132. The bracket 130 is fixed by the eye 132 by means of a screw in a forked end 134 of an essentially Y-shaped conveyor element 136, two legs of which are provided with runners 138. The runners 138 make a movement of the fixing means along the laterally projecting flanges of an inverted T-shaped rail 140 possible, for example by means of a chain (not shown). The free ends of the bracket 130 are fixed in essentially plate-shaped clamping elements 144 and 146 which are interconnected and are pivoted about a shaft 142. The clamping element 144 bears a clamping part 148, which at the side facing the clamping element 146 is provided with a longitudinal groove whose width is approximately the same as the thickness of the clamping element 146.

The fixing means can be moved from a closed position, shown in FIG. 5c, to an open position, shown in FIG. 5d, by pushing the legs of the bracket 130 apart, as will be described with reference to FIGS. 5a and 5b. A control lever 150 disposed along the rail 140 and movable along with the fixing means at least over a certain distance can pivot about a shaft 152, as indicated by means of the double arrow 154. The end of the control lever 150 is provided with a wear-proof and friction-reducing covering 156 and has a width which is greater than the distance between the legs of the bracket 130 in the vicinity of the clamping elements 144 and 146 in the closed position of the fixing means. When the control lever 150 is tilted between the legs of the bracket 130, the legs will be pressed apart, with the result that the clamping elements 144 and 146 will assume the open position shown in FIG. 5d. In this open position an organ can be inserted between the clamping part 148 and the clamping element 146. The control lever 150 is then tilted from there between the legs 130, as a result of which the spring force in the bracket 130 causes the clamping elements 144 and 146 to move towards each other, while the abovementioned organ is clamped with a force which is determined by the elasticity properties of the bracket 130.

Figure 6C:
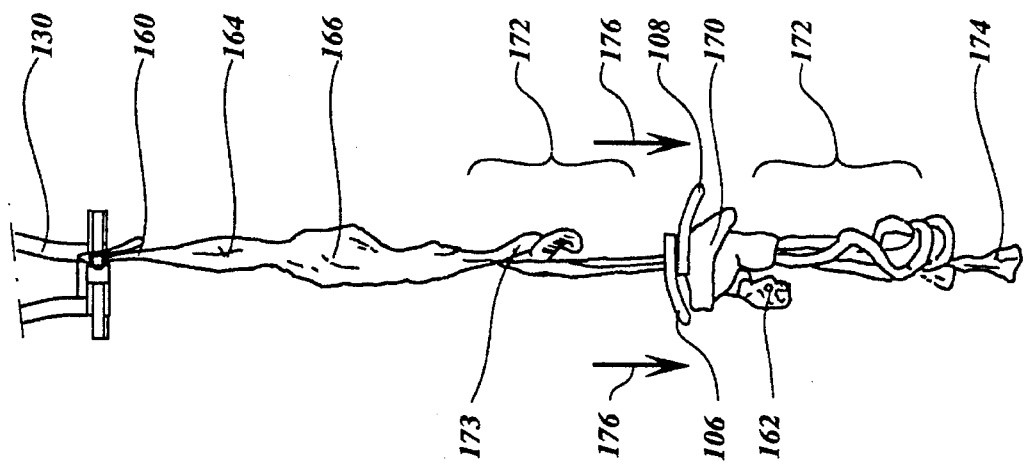
FIG. 6c shows on a slightly reduced scale the cluster of organs according to FIGS. 6a and 6b, in a subsequent stage of processing.
Figure 6B:
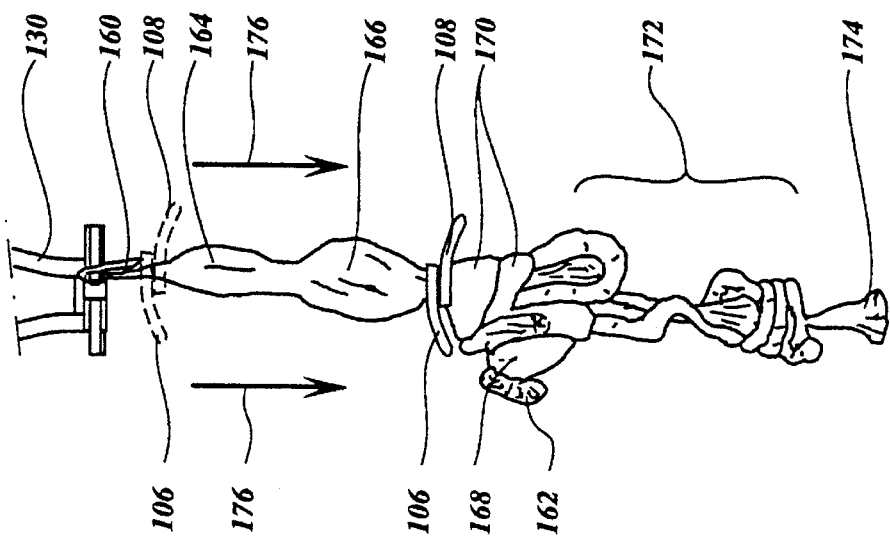
FIG. 6b shows the cluster of organs of FIG. 6a in a subsequent processing position, in which a stripping means is shown diagrammatically.
Figure 6A:
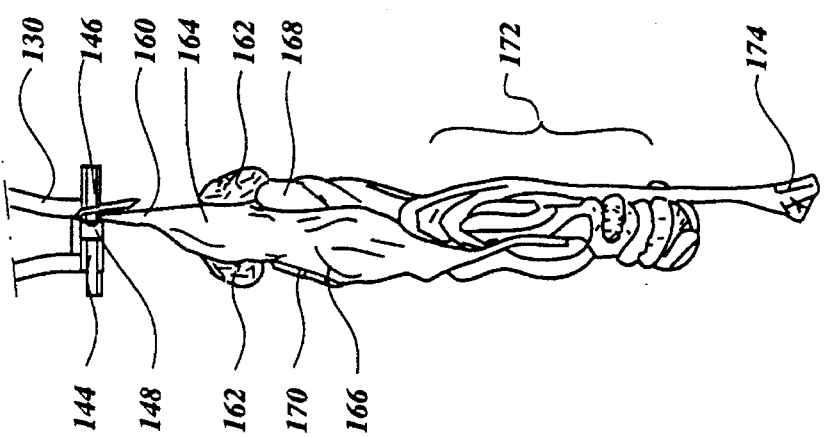
FIG. 6a shows a cluster of organs of a bird fixed with the aid of the fixing means according to FIGS. 5a–5d.

FIG. 6a shows how a cluster of organs 38 from a bird is fixed at the gullet 160 thereof relative to the fixing means which is described with reference to FIGS. 5a–5d, and only a part of which is shown. The cluster of organs comprises lungs 162, glandular stomach 164, gizzard 166, heart 168, liver 170, intestines 172 and cloaca 174.

FIG. 6b shows the result of a stripping operation carried out with the stripping means described before with reference to FIGS. 3a–3c. Only the stripping elements 106 and 108 of this stripping means are shown in FIG. 6b. Starting from the situation shown in FIG. 6a and the placing of the gullet 160 in the passage area 120 of the stripping elements 106 and 108, after the stripping elements 106 and 108 have passed through the path beginning at the position of the stripping elements indicated by dashed lines and ending at the position indicated by solid lines, in the direction of the arrows 176, the glandular stomach 164 and the gizzard 166 have been exposed completely, and the organs originally lying alongside them have been stripped off by stripping elements 106 and 108, but they are still connected to the cluster of organs, so that their interconnection is not completely lost.

FIG. 6c shows the situation which arises when the stripping elements 106 and 108 are moved even further away from the fixing point of the cluster of organs (in this case the gullet 160). The useful organs, such as heart, liver 170 and lungs 162, come under the stripping elements 106 and 108 here, hanging at a certain point from the cluster of intestines 172. In particular, the part of the intestines adjoining the gizzard 166, comprising the duodenum 173, plays an important role here. From the position shown in FIG. 6c, it is particularly simple to feed heart, liver and lungs automatically with the aid of the fixing means and suitable guides to a device known per se for separating said organs.

Figure 6D:
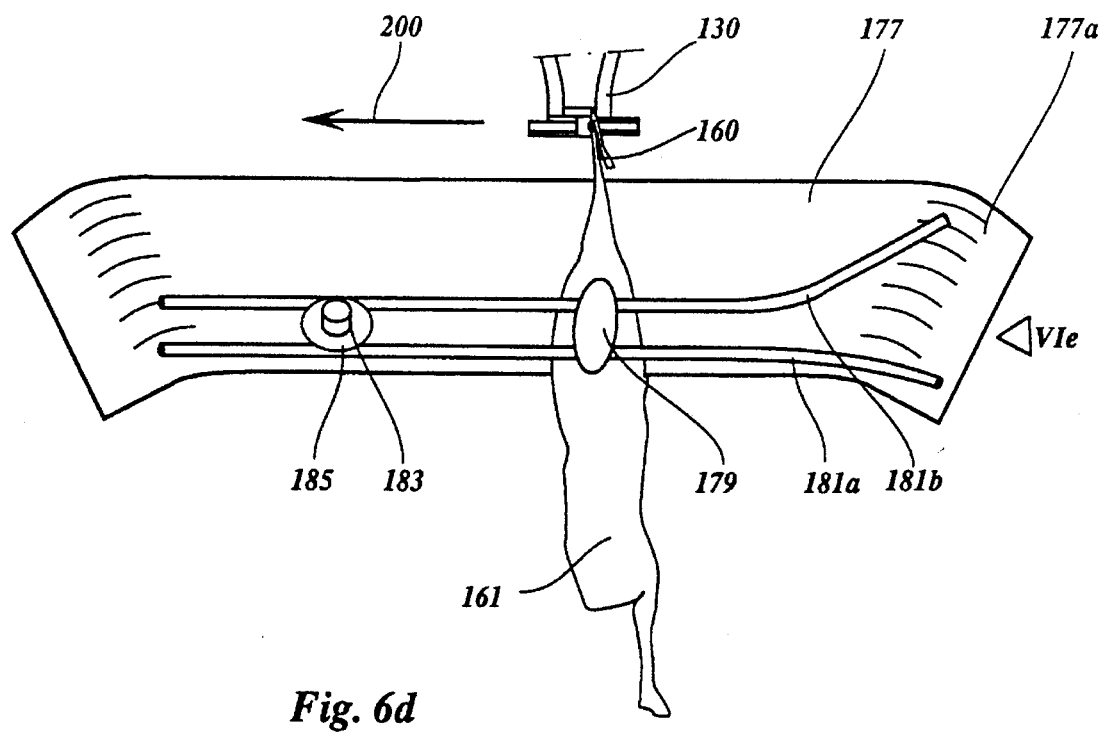
FIG. 6d illustrate diagrammatically the separating an organ from a cluster of organs.
Figure 6E:
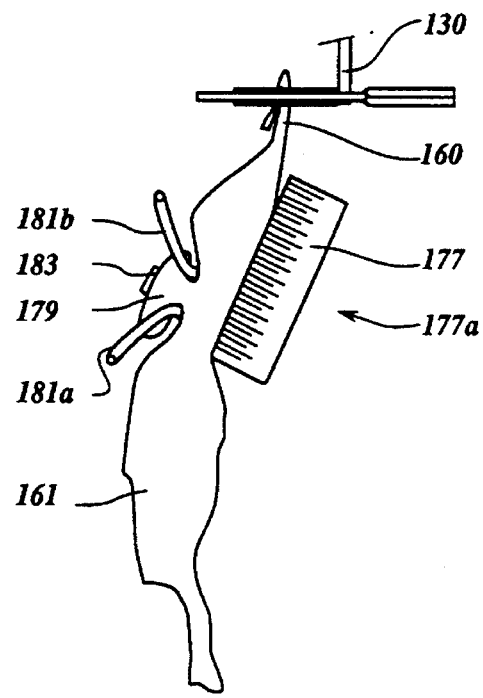
FIG. 6e shows a view in the direction of arrow VIe of the separating means of FIG. 6d.

The cluster of organs 161 shown diagrammatically in FIGS. 6d and 6e is fixed at the gullet 160 in the fixing means already shown in FIGS. 5a–5d, and is moved along in the direction of the arrow 200. Going from right to left in FIG. 6d, the cluster of organs 161 first meets an inlet side 177a of a guide plate 177 which extends essentially parallel to the direction of conveyance 200, and is disposed in a manner not shown in any further detail in a frame. The arrangement of the guide plate 177 at an angle with the vertical ensures that the cluster of organs 161 is oriented in such a way that an organ 179 to be separated finishes up at the side of the cluster of organs 161 facing away from the guide plate 177 between guide rods 181a and 181b, the major part of which extends parallel to the guide plate 177 and in the direction of conveyance 200. The guide rods 181a and 181b, disposed in a manner not shown in any further detail in the abovementioned frame, define between them a guide slit which in an inlet part converges in the direction of conveyance 200. The organ 179 thus finishes up at one side of the guide slit, while the remaining organs finish up at the other side of the guide slit. The width of the guide slit is selected so that it is small enough to prevent the organ 179 from passing through the slit in the direction of the guide plate 177. The distance of the guide rods 181a and 181b from the guide plate 177 is so small that the cluster of organs 161 is compressed locally. This helps to make the organ 179 bulge out from the cluster of organs and promotes correct positioning of the organ relative to the guide slit.

Going further to the left in FIG. 6d, a rotary cutter 185 driven by a motor 103 is set up, by means of which the connection between the organ 179 and the remainder of the cluster of organs 161 is broken automatically during conveyance in the direction of the arrow 200. The organ 179, for example a heart from a cluster of organs of a bird, is then discharged for further processing. Yet other organs can be separated from the cluster of organs 161 in a similar way.

Figure 6F:
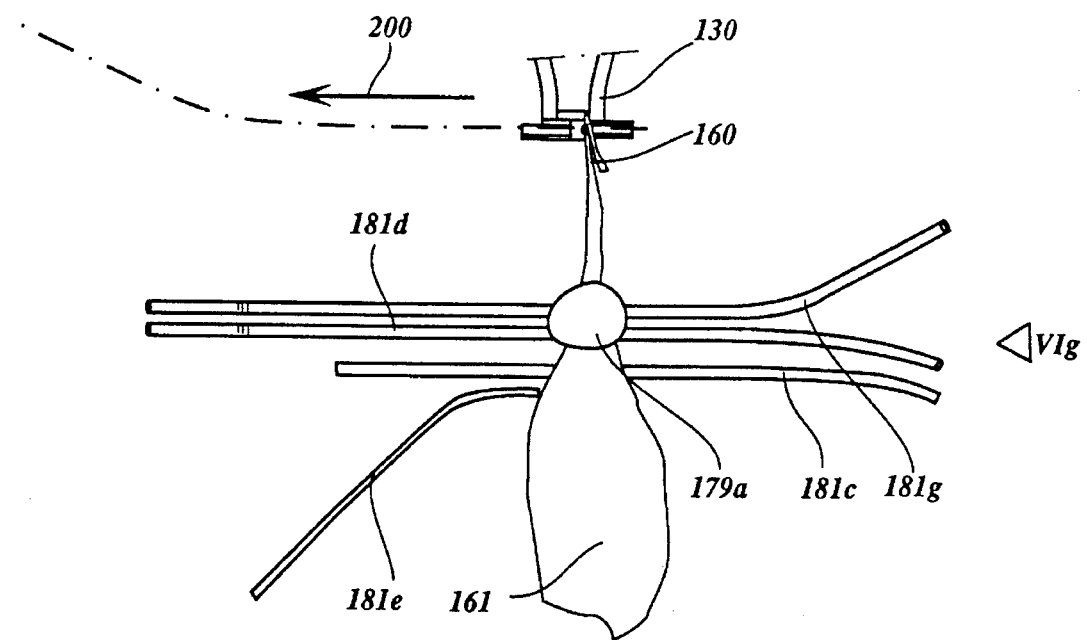
FIG. 6f illustrates diagrammatically another way of separating an organ from a cluster of organs.
Figure 6G:
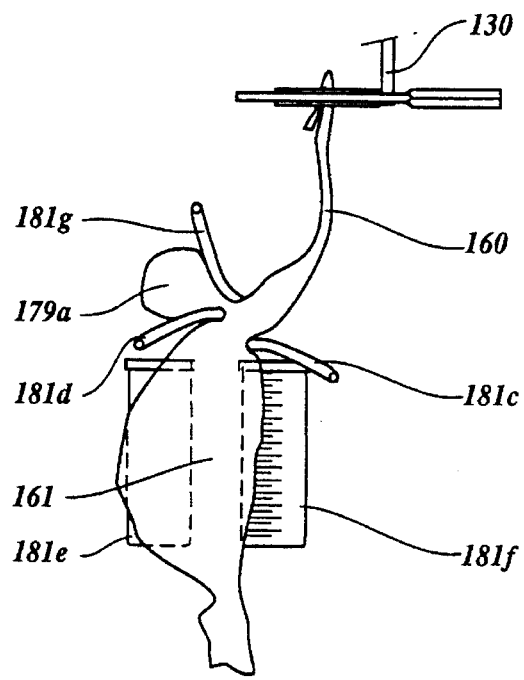
FIG. 6g shows a view in the direction of arrow VIg of the separating means of FIG. 6f.

FIGS. 6f and 6g show a cluster of organs 161 fixed at the gullet 160 in the fixing means according to FIG. 5a–5d, and moving in the direction of arrow 200. In the path of the cluster of organs 161 three guide rods 181c, 181d, and 181g extend essentially parallel to the direction of conveyance 200. Two parallel stripping plates 181e and 181f extend below the guide rods 181c and 181d. The guide rods 181c, 181d, 181g, and the stripping plates 181e, 181f are disposed in a manner not shown in any further detail in a frame and are each provided with suitable feed-in parts. The guide rods 181c and 181d cross, when seen from the fixing means. The stripping plates 181e and 181f, as seen in the direction of conveyance 200, diverge from the guide rods 181c, 181d, defining a guide slit between them. In operation, by the movement of the fixing means, the cluster of organs 161 is caught between the guide rods 181c, 181d, and 181g, which are disposed such that a predetermined organ 179a or organs is/are brought at a distance from the other organs of the cluster 161, and the tissue connection between the organ(s) 179a and the rest of the cluster is caught between the guide rods 181d and 181g. Next, the other organs are caught in and under the guide slit between the stripping plates 181e, 181f. Further conveyance of the cluster 161 in the direction 200 causes one or more organs to be stripped off partially or completely from the cluster, the stripping plates 181e, 181f bringing the organs below them down relative to the point of fixing of the cluster for breaking tissue connections. When the cluster is conveyed further in the direction of arrow 200, the point of fixing diverges from the guide bars 181d and 181g. This causes the tissue connection adjacent to the slit defined by the guide bars 181d and 181g to break.

It is to be noted that the stripping plates may be made from rigid or flexible, resilient material. The width of the guide slit between the stripping plates may be varied along its length to provide a suitable passage for certain organs in the cluster.

Figure 7A:
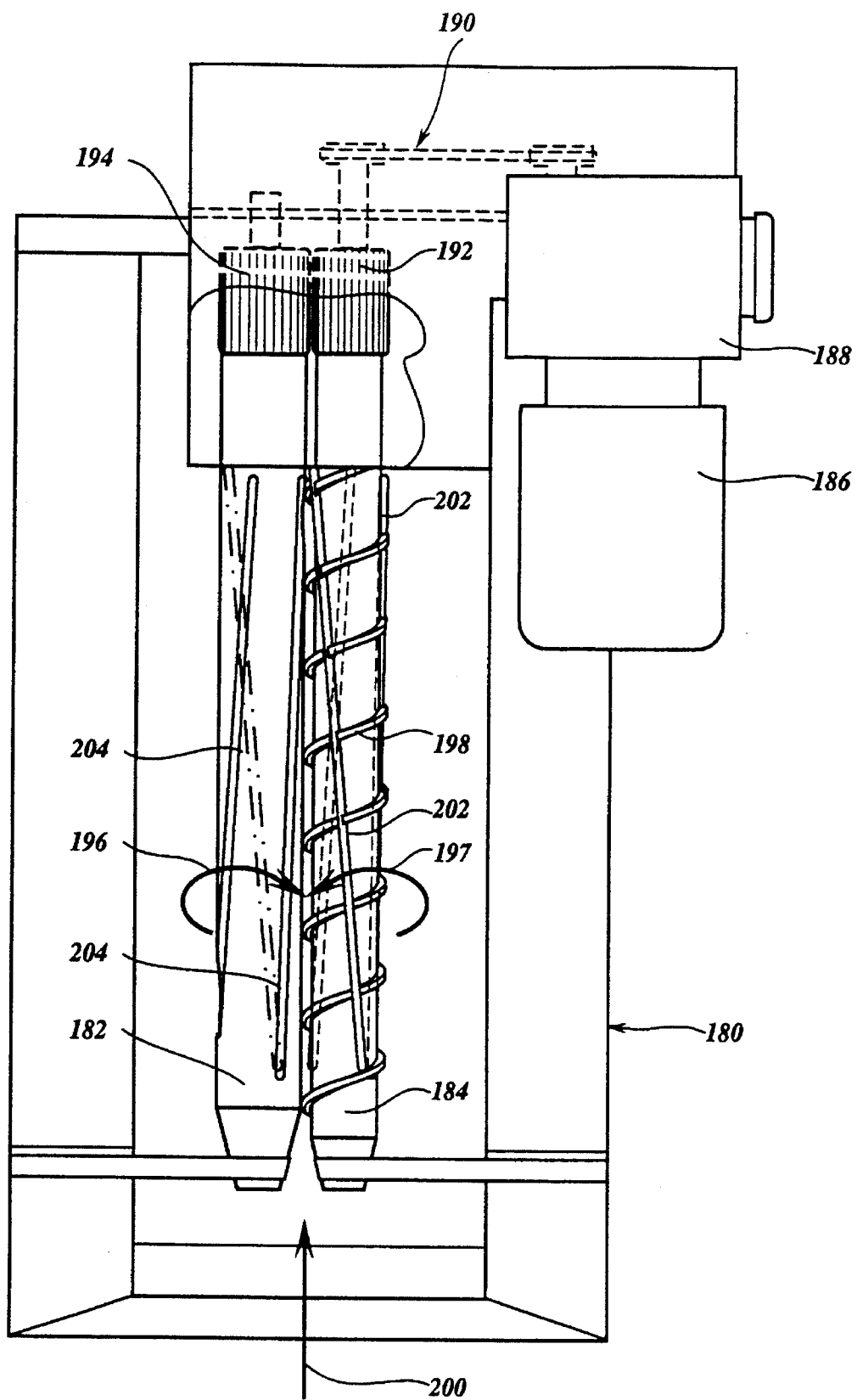
FIG. 7a shows a top view of a separating means according to the invention.
Figure 7B:
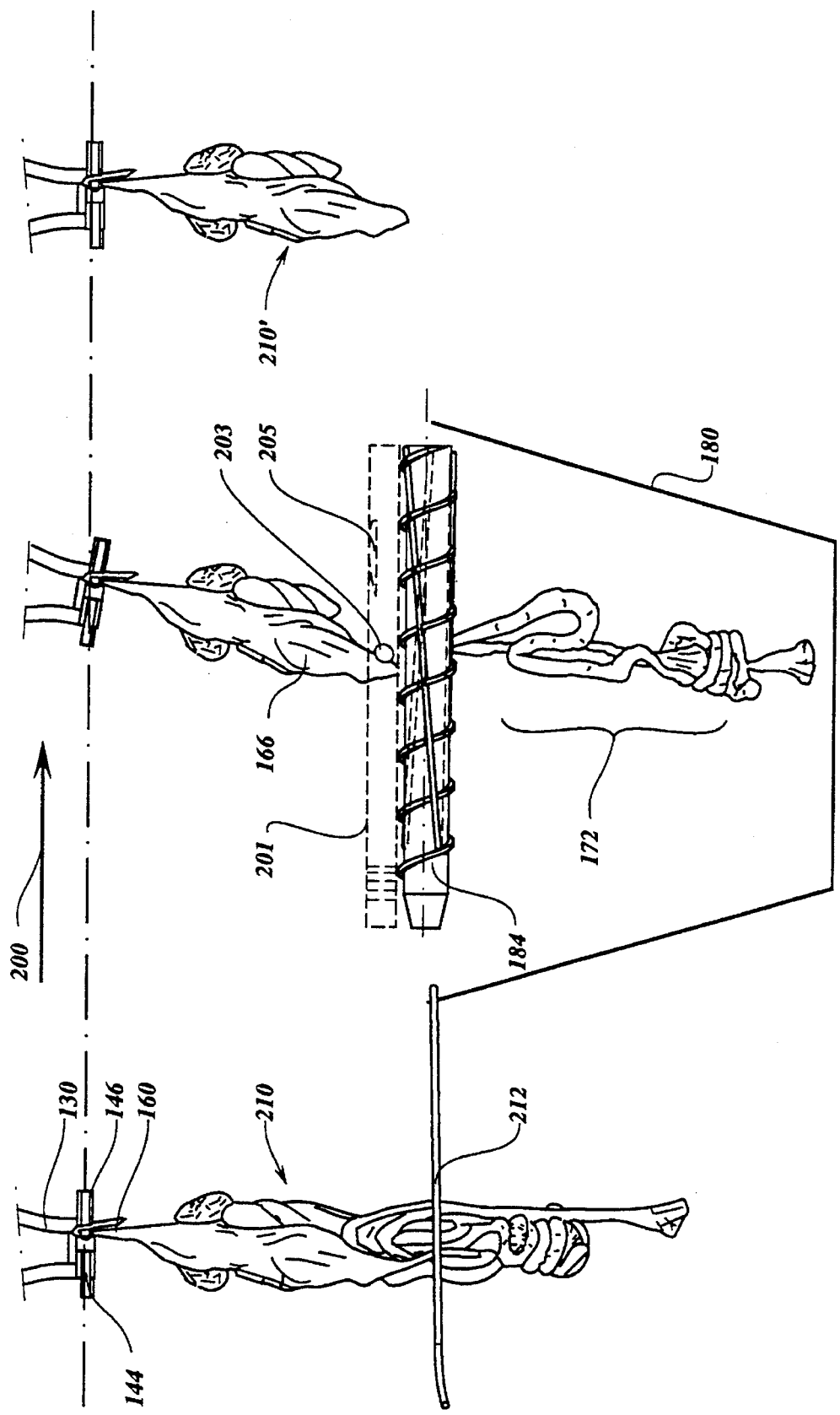

FIGS. 7a and 7b illustrate the design and mode of operation of separating means, which are used for separating intestines, and possibly gall-bladder from a cluster of organs of a bird, which cluster of organs is clamped e.g. at the position of the gullet 160 by means of clamping elements 144 and 146. The separating means comprise a container 180 which is provided with an outlet, and above which two elongated, parallel rollers 182, 184 which are rotatable in opposite directions relative to each other are mounted. The rollers are driven by a motor 186 by way of a reducer 188 and a belt transmission 190, the belt of the belt transmission 190 being coupled directly to a drive wheel of the roller 184, which roller is provided at one end thereof with a gear wheel 192 which meshes with a gear wheel 194 of the roller 182. The rollers 182 and 184 will thus rotate in opposite directions when driven, as indicated by the arrows 196 and 197.

First, the roller 184 is provided with a helical conveyor rib 198 on the outside surface thereof, with a pitch which is considerably smaller than the length of the roller 184. In a known manner, the conveyor rib 198 brings about conveyance of the organs present between the rollers 182 and 184, in the direction indicated by the arrow 200 in the case of the directions of rotation 196 and 197 of the rollers 182, 184. The roller 184 is also provided on its external surface with three helical separating ribs 202, the pitch of which is considerably greater than the length of the roller 184. The roller 182 is provided on its external surface with three grooves 204, which are shaped in a complementary way to the ribs 202 of the roller 184, and at least partially accommodate said ribs 202 when a part of a rib 202 is lying in the nip of the rollers 182 and 184. The combination of the ribs 202 and the grooves 204 causes a downward directed force upon the organs, such as intestines, lying between the rollers.

The separating means in FIG. 7a are shown only in a very rough diagram in FIG. 7b. Above the separating means shown in the central part of the figure is a conveyor, along which fixing means such as those shown in FIG. 5a are moved in the direction of the arrow 200. The clusters of organs 210 of a bird conveyed by the fixing means are guided by one or more diagrammatically shown guide rods 212 between the rollers 182 and 184, only the latter of which is shown in FIG. 7b. The downward force exerted by the rollers 182 and 184 on the intestines means that the intestines are pulled completely below the rollers, in which case the action of the ribs 202 and grooves 301 causes the connection between the gizzard 166 and the cluster of intestines 172 to be broken. The cluster of internal organs 210' is then conveyed further along the conveyor, hanging from the fixing means, while the intestines fall from the separating means into the container 180 and are discharged from there.

An embodiment of organ blocking means in the form of two vertical strips 201, disposed on either side of the nip of the rollers 182 and 184, is shown by dashed lines in FIG. 7b. The distance between the strips 201 is selected in such a way that the intestines 172 can move through between the strips 201, and can also take the gall-bladder 203 along with them until it is between the strips 201. The organs higher up, such as the gizzard 166, cannot pass the strips 201, and rest on the top edge of the strips 201. when the cluster of organs 210 moves along in the direction of conveyance 200, a cutter 205, extending between the strips 201, the sharp edge or which races in the opposite direction to that of the arrow 200, separates the intestines 172 and gall-bladder 203, on the one hand, from the remaining organs, on the other.

Figure 7C:
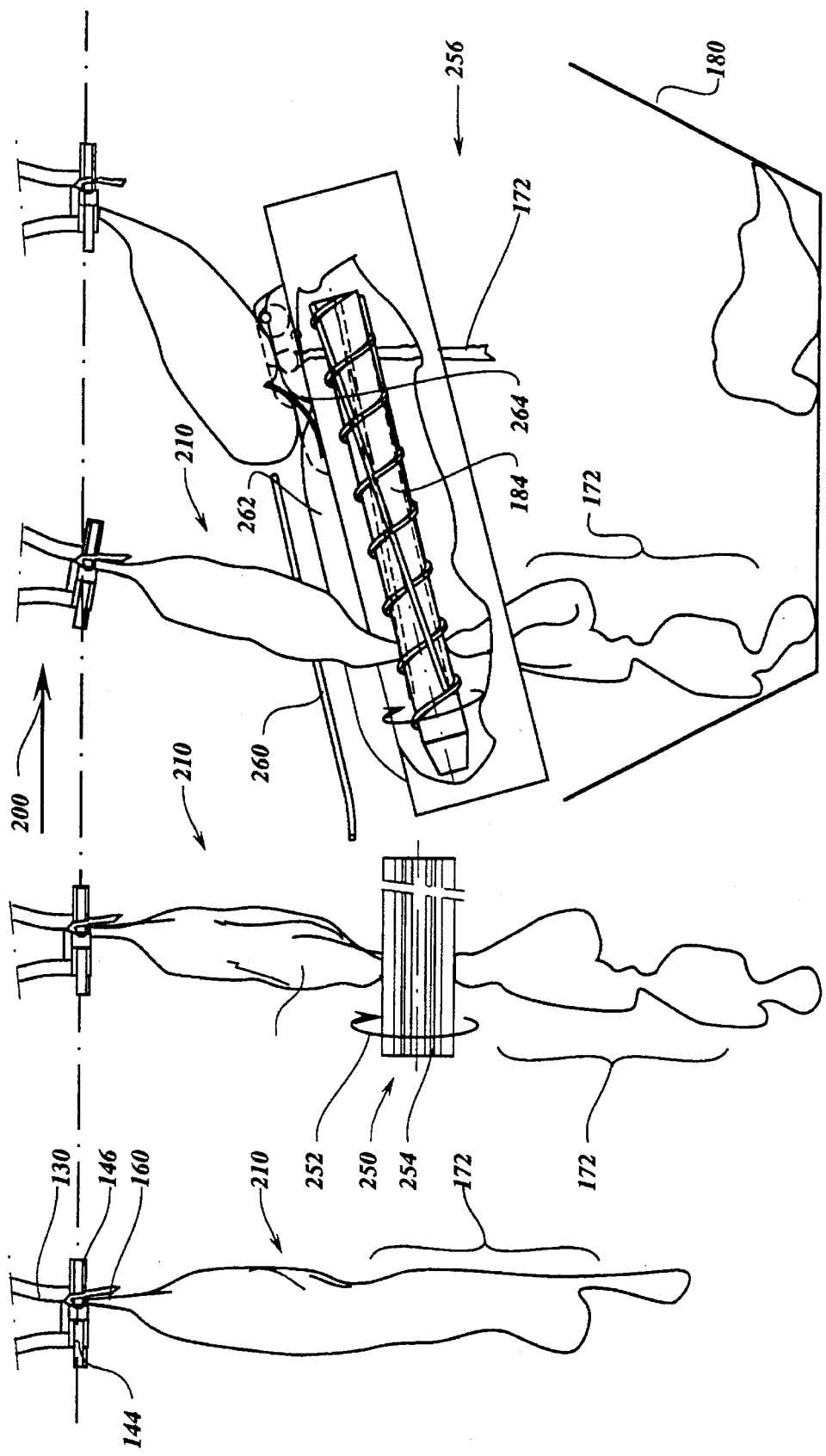
FIG. 7c illustrates an operation to be carried out on a cluster of organs with another separating means.
Figure 7D:
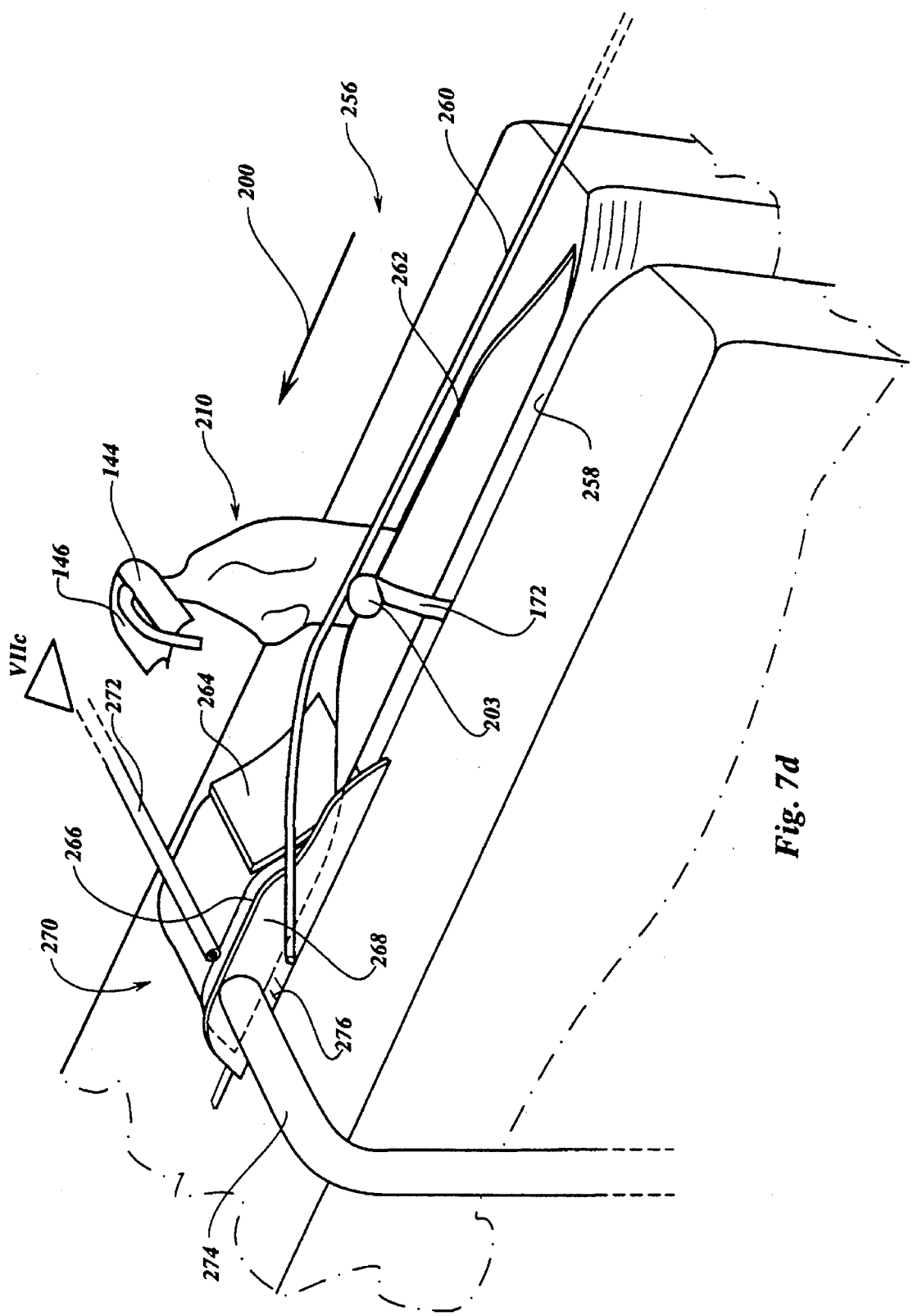
FIG. 7d is a perspective view showing in more detail a part of the coparating means of FIG. 7c.

FIG. 7c and 7d shows in a rough diagram similar to FIG. 7b the processing steps and devices used for separating intestines and gall-bladder from a cluster of organs 210, fixed by fixing means such as those shown in FIG. 5a, and moving in the direction of arrow 200. It is remarked that all structural elements of devices are connected to and supported by a frame (not shown for the sake of clarity).

Describing subsequent processing steps when the cluster of organs 210 is conveyed from the left side of FIG. 7c in the direction of conveyance 200, the cluster of organs 210 is first fed to one or more stretching rollers 250, which are rotated in the direction of arrow 252 and are provided on its outer surface with radially and axially extending flaps made of a resilient material, such as a rubber compound. The flaps 254 stroke the cluster of organs 210 at the height where the bundle of intestines 172 is situated, thereby breaking tissue connections between parts of the intestines and unfolding the bundle to an extent which is illustrated in FIG. 7c.

Next, as shown at the right hand side of FIG. 7a and in FIG. 7d, the intestines 172 and gall-bladder 203 are separated from the remaining organs of the cluster 210 by a separating device 256. The separating device 256 contains a guide slit 258 into which the intestines 172, stretched by one or more stretching rollers 250, are fed by conveying the fixing means in the direction of the arrow 200. At the same time, the cluster of organs above the guide slit 258 is led to one side thereof by guide rod 260. When brought to this side, the cluster 210 is guided by a guide plate 262 and held away from the guide slit 258, while the intestines 172 are caught in the guide slit 250 and between rollers 182, 184, of which only the latter is visible. When conveyed along, the cluster is pulled over sloping part 264 which orientates the cluster such that the liver is brought down.

The part of the separating means 256 to which the cluster is next conveyed, contains two walls 266, 268 extending upwards from the edges of the guide slit 258 facing each other. The wall 266 is part of a guide structure 270 containing a duct 272 for providing a water knife across the upper part of the guide slit defined by walls 266, 268. A water jet from duct 272 is directed into an opening of a vacuum tube 274 connected to wall 268. In the wall 268, the vacuum tube 274 also has an aperture of which the dimensions are such that the gall-bladder 203 can pass therethrough. In the guide slit 258 adjacent to the vacuum tube 274, a guide slit blocking element 276 is provided.

When the cluster of organs 210 is moved in the direction of arrow 200 in the region of the walls 266, 268, the water jet from duct 272 cuts off the gall-bladder 203 and any remaining parts of the intestines 172 from the cluster 210, and the gall-bladder 203 and intestine parts are removed through the vacuum tube 274.

Instead of a water jet for cutting off the gall-bladder 203, a stationary or moving knife can be used for the same purpose. In particular, in the guide slit defined between the walls 266 and 268 a rotary cylindrical hollow knife may be provided, the end of which pointing opposite to the direction of conveyance 200 having an axial knife edge and an inner diameter which is sufficiently large to let a gall-bladder pass. The interior of the rotating cylindrical knife is part of a vacuum system. In this way, the gall-bladder is drawn into the hollow knife at the knife edge end thereof by the partial pressure in the knife, and then the gall-bladder is separated from the cluster by a cutting operation of the knife edge of the hollow rotary knife.

Figure 8:
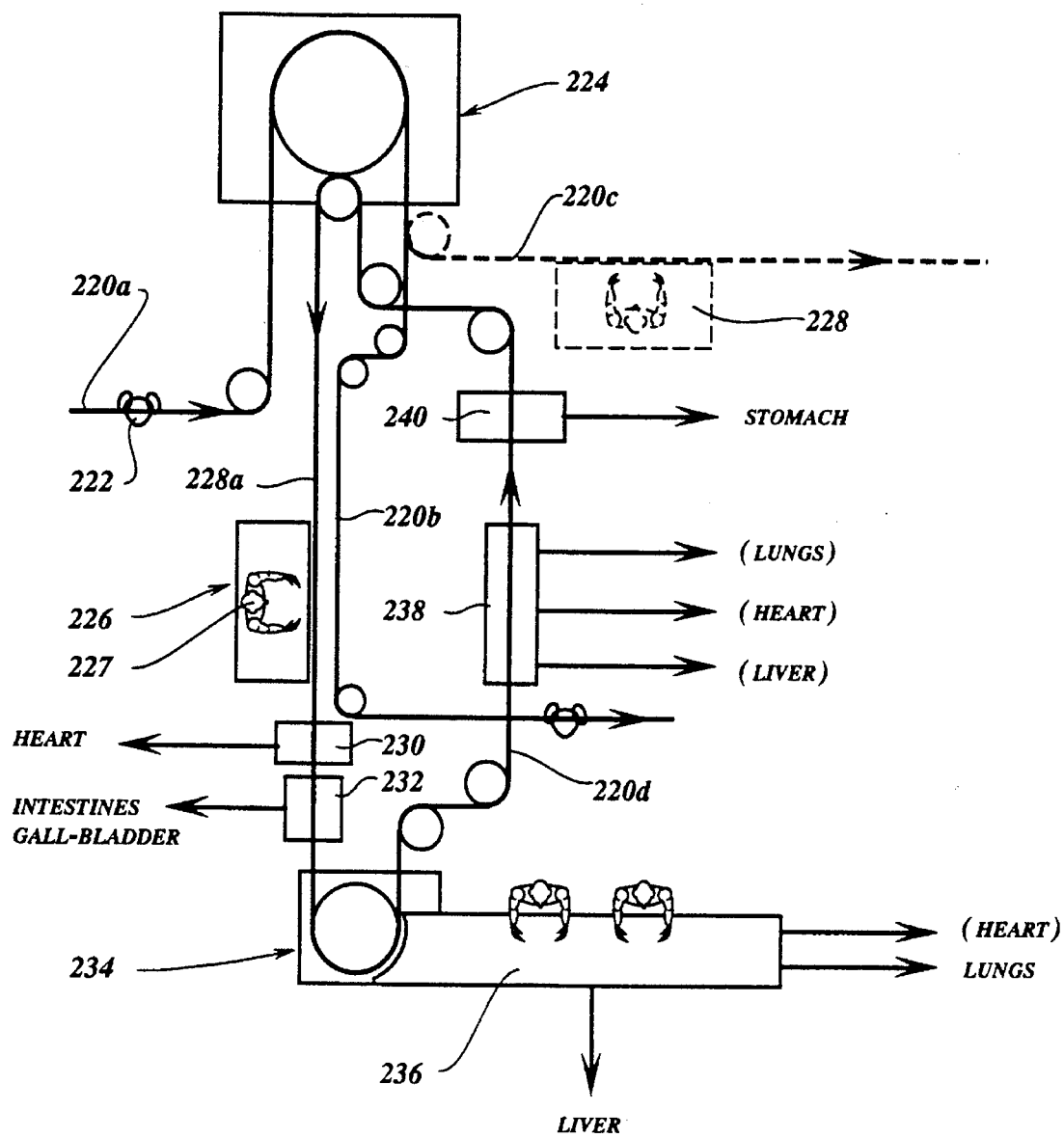
FIG. 8 shows a diagrammatic top view of an organ processing line designed according to the invention.

FIG. 8 shows how a slaughtered animal 222 is fed on a conveyor 220a to an evisceration device 224 of a carrousel type known per se. The eviscerated carcass is then discharged on conveyor 220b by way of an inspection station 226 with a veterinary inspector 227, who may if desired be replaced by a computer vision inspection system. At the position of the evisceration device 224, which is equipped with evisceration means of the type shown in FIGS. 1a and 1b, the cluster of organs which has been removed, the cluster comprising gullet, stomach (in the case of poultry: glandular stomach and gizzard), heart, lungs, liver, gall-bladder and intestines, is transferred to a conveyor 228a with fixing means of the type shown in FIGS. 5a–5d. The conveyors 220b and 228a run parallel and in synchronism along of the inspection station 226, it being ensured that a cluster of organs passes the inspection station 226 at the same time as the carcass to which it belongs, so that the relation between the cluster of organs and the carcass is directly apparent. However, if this relation is established in a different way, carcasses can also be inspected separately from their clusters of organs, as illustrated by dashed lines in the figure with conveyor part 220c and inspection station 220.

Along conveyor 228a, after the inspection station 226 has been passed, the heart can be removed from the cluster of organs in a processing station 230 (for example, in the manner shown in FIGS. 6d and 6e), and the intestines and the gall-bladder can be removed from the cluster of organs in a processing station 232 (for example, in the manner shown in FIG. 7b). However, the sequence of the processing stations 230 and 232 along the conveyor belt 228a can also be reversed, while they can also be left out entirely in the organ separating line shown in FIG. 8.

The cluster of remaining organs is then fed to a stripping device 234, for example of the type shown in FIGS. 2a–2d or 3a–3c. If the cluster of organs has already undergone a processing operation in processing station 232, the stripping operation in stripping device 234 will result in at least the organs liver, heart and lungs being separated completely from the remainder of the cluster of organs. Said organs can then be processed further, possibly partially by hand, along a conveyor belt 236. It will be clear that the heart will not be present on the conveyor belt 236 if the cluster has already undergone an operation in processing station 230.

If the processing stations 230 and 232 are not present along the conveyor 228a, the stripping operation in stripping device 234 will generally be carried out only until the processing stage shown in FIG. 6b or FIG. 6c has been reached. The cluster of organs can be supplied in this state by way of a conveyor 220d to a device 238 which is known per se for separating liver, heart and lungs. Finally, the stomachs remaining from the cluster of organs are separated and processed in a stomach machine 240.

It will be clear from the above that, by maintaining a fixing of organs which may have been achieved already during an evisceration operation, an important further mechanisation of the activities in a slaughterhouse is possible, in order to raise the quality of the products supplied and to reduce the production costs.

While the invention has been described and illustrated in its preferred embodiments, it should be understood that departures may be made therefrom within the scope of the invention, which is not limited to the details disclosed herein.

What is claimed is:

1. A method for separating one or more organs or a part thereof from a cluster of interconnected internal organs of a slaughtered animal, in particular a slaughtered bird, comprising the following steps:

fixing of at least one of the organs, a part thereof or a connection between the organs when the cluster is at least partly in the body of the slaughtered animal;

taking the cluster out of the body, while maintaining the condition of fixing; and breaking one or more tissue connections in the cluster, while maintaining the condition of fixing, on the basis of a spatial orientation of the cluster determined by the still maintained condition of fixing thereof.

2. A method for separating one or more organs or a part thereof from a cluster including a strong organ and other interconnected internal organs of a slaughtered animal, in particular a slaughtered bird, comprising the following steps:

taking the cluster out of the body of the slaughtered animal;

thereafter fixing the strong organ at least one point and suspending the cluster from the at least one point of fixing and bringing the cluster into a spatial orientation which is determined by the way of fixing;

breaking tissue connections in the cluster on the basis of the spatial orientation suspended cluster; and separating the intestines from the cluster before terminating the fixing.

3. A method according to claim 1 or 2, wherein the fixing is maintained by further fixing at least one of the organs, a part thereof or a connection between the organs which is in a predetermined position relative to the point or points of the first fixing, following which further fixing the first fixing is undone.

4. A method according to claim 1 or 2, wherein the cluster is allowed to hang free from the point or points of fixing.

5. A method according to claim 1 or 2, wherein the fixing is achieved by clamping the cluster part in question.

6. A method according to claim 1 or 2, wherein for breaking the tissue connections the cluster is supported at at least one side, a pressure force is exerted opposite to the direction of support on tissue situated adjacent to an organ or organ part to be separated for causing the latter to bulge out, and the organ or organ part to be separated is separated from the remaining organs.

7. A method according to claim 1 or 2, wherein for breaking the tissue connections a force is exerted on organs in a direction away from the point or points or the fixing of the cluster.

8. A method according to claim 1 or 2, wherein from a cluster of organs comprising stomach, heart, lungs, liver, gall-bladder and intestines, first the intestines and the gall-bladder are separated, and then at least one of the other organs is separated.

9. A device for fixing a part of a cluster of interconnected internal organs of a slaughtered animal, in particular a bird, comprising:

means for fixing at least one of the organs, a part thereof or a connection between the organs, the fixing means being adapted to move through an evisceration opening into the body of the slaughtered animal, and to fix a part of the cluster relative to the fixing means; and evisceration means designed to interact with the fixing means for taking the cluster out of the body, the evisceration means comprising a tiltable scoop.

10. A device according to claim 9, wherein the scoop is disposed near one end of an elongated carrier and can be swung about an axis which is essentially at right angles to the longitudinal axis of the carrier, the fixing means comprising two jaw parts which are fitted near the end of the carrier and are movable relative to each other in a controllable manner for clamping a part of the cluster between them.

11. A device according to claim 10, wherein the scoop is provided with a slit for accommodating the gullet, the jaw parts of the fixing means defining a similar slit in line with the scoop slit and at a distance from the scoop.

12. A device according to claim 10, wherein the combination of the jaw parts of the fixing means forms the scoop.

13. A device for separating one or more organs or a part thereof from a cluster of interconnected internal organs of a slaughtered animal, in particular a slaughtered bird, comprising:

means for fixing of at least one of the organs, a part thereof or a connection between the organs when the cluster is at least partly in the body of the slaughtered animal;

means for taking the cluster out of the body while maintaining the condition of fixing; and means for breaking one or more tissue connections in the cluster, while maintaining the condition of fixing, on the basis of a spatial orientation of the cluster determined by the still maintained condition of fixing thereof.

14. A device according to claim 13, wherein said means for fixing forms part of a conveyor system to feed the organs of the cluster along a predetermined path and in a certain spatial orientation to a processing station for separating at least one organ or a part thereof from the cluster.

15. A device according to claim 14, wherein the means for fixing comprises two jaw parts which are movable in a controllable way relative to each other for clamping a part of the cluster between them.

16. A device according to claim 15, wherein the jaw parts are biased towards each other.

17. A device according to claim 16, wherein the jaw parts are disposed at the end of the legs of an essentially U-shaped spring bracket interacting with a spreader for moving the jaw parts apart.

18. A device according to claim 15, wherein one jaw part is provided with an elongated narrow side at the side facing the other jaw part, and the other jaw part is provided with an elongated narrow slit for accommodating the narrow side of the first jaw part.

19. A device according to claim 13 wherein said means for fixing comprises a first fixing means and a second fixing means, the second fixing means being provided along the path of the first fixing means, and being configured to take over the cluster from the first fixing means.

20. A device according to claim 13 wherein said means for fixing is adapted to be conveyed along a path, and separating means having a support guide extending essentially parallel to the path of the fixing means, at a distance from which and parallel to which two guide elements bounding a guide slit extend, the guide elements and the support guide being situated for guiding the cluster at opposite sides, while a separating element is designed for operation across the guide slit.

21. A device according to claim 13 further comprising means for separating having one or more stripping means which at least partially bound one or more passage areas, and are adapted to move jointly relative to a part of the cluster while exerting a force on organs for breaking tissue connections in the cluster in a fixed condition, the stripping means comprising stripping elements which are movable relative to each other, and the edges of which facing each other are adapted to bound at least one passage area.

22. A device according to claim 13 wherein said means for fixing are adapted to be conveyed along a path, the means for separating having one or more stripping means comprising two elongated parallel elements, the edges of which face each other, and partially bound a passage area in the form of a guide slit extending at an angle to the path of the fixing means.

23. A method for separating intestines from a cluster of interconnected intestines, gall-bladder and other internal organs, the cluster being fixed at at least one of the other organs, a part thereof or a connection between the organs, the method comprising the steps of breaking one or more tissue connections in the cluster, and bringing at least a part of the intestines between at least one pair of elongated, essentially parallel rollers which are adapted to be rotated in opposite directions to each other, and which rollers are each provided on the outside surface thereof with means for exerting a pulling force on the intestines away from the rest of the cluster.

24. A device for separating intestines from a cluster of interconnected intestines, gall-bladder and other internal organs, the cluster being fixed at at least one of the other organs, a part thereof or a connection between the organs, the device comprising separating means for breaking one or more tissue connections in the cluster, and having at least one pair of elongated, essentially parallel rollers which are adapted to be rotated in opposite directions to each other, and which rollers are each provided on the outside surface thereof with means for exerting a pulling force on the intestines away from the rest of the cluster, and wherein organ guide means are fitted at the side of the rollers facing the point or points of fixing of the cluster, which organ guide means are adapted to orientate the cluster and partially bound a passage area in the form of a guide slit leading to the rollers, which passage area is large enough to allow the intestines and the gall-bladder through, but is too small to allow adjacent organs to pass.

25. A device according to claim 24, wherein a separating element is designed for operation across the guide slit, the separating element being positioned and adapted to break the tissue connection between the gall-bladder and the cluster.

26. A device according to claim 25, wherein adjacent to the separating element a vacuum tube is provided, having a suction aperture positioned and adapted to remove the gall-bladder separated by the separating element.

27. A device according to claim 24, comprising a second pair of rollers each having along a part of its length axially and radially extending flaps made of a resilient material.

28. A device for separating one or more organs or a part thereof from a cluster including a strong organ and other interconnected internal organs of a slaughtered animal, in particular a slaughtered bird, comprising:

means for taking the cluster out of the body of the slaughtered animal;

means for thereafter fixing the strong organ at at least one point and suspending the cluster from the at least one point of fixing and for bringing the cluster into a spatial orientation which is determined by the way of fixing;

means for breaking tissue connections in the cluster on the basis of the spatial orientation of the suspended cluster; and means for separating the intestines from the cluster before terminating the fixing.

29. A device according to claim 28, wherein said means for fixing forms part of a conveyor system to feed the organs of the cluster along a predetermined path and in a certain spatial orientation to a processing station for separating at least one organ or a part thereof from the cluster.

30. A device according to claim 28, wherein said means for fixing comprises a first and a second fixing means, the second fixing means being provided along the path of the first fixing means, and being designed to take over the cluster from the first fixing means.

31. A device according to claim 29, wherein the means for fixing comprises two jaw parts which are movable in a controllable way relative to each other for clamping a part of the cluster between them.

32. A device according to claim 31, wherein the jaw parts are biased towards each other.

33. A device according to claim 32, wherein the jaw parts are disposed at the end of the legs of an essentially U-shaped spring bracket interacting with a spreader for moving the jaw parts apart.

34. A device according to claim 31, wherein one jaw part is provided with an elongated narrow side at the side facing the other jaw part, and the other jaw part is provided with an elongated narrow slit for accommodating the narrow side of the first jaw part.

35. A device according to claim 28, wherein said means for fixing is adapted to be conveyed along a path, and further comprising separating means having a support guide extending essentially parallel to the path of the fixing means, at a distance from which and parallel to which two guide elements bounding a guide slit extend, the guide elements and the support guide being situated for guiding the cluster at opposite sides, while a separating element is designed for operation across the guide slit.

36. A device according to claim 28, comprising means for separating having one or more stripping means which at least partially bound one or more passage areas, and are adapted to move jointly relative to a part of the cluster while exerting a force on organs for breaking tissue connections in the cluster in a fixed condition, the stripping means comprising stripping elements which are movable relative to each other, and the edges of which facing each other are adapted to bound at least one passage area.

37. A device according to claim 28, wherein said means for fixing is adapted to be conveyed along a path, further comprising means for separating having one or more stripping means comprising two elongated parallel elements, the edges of which face each other, and partially bound a passage area in the form of a guide slit extending at an angle to the path of the fixing means.

38. A method for fixing at least one organ of a cluster of interconnected internal organs of a slaughtered animal, in particular a slaughtered bird, or a part of the organ(s), or a connection between the organs, the method comprising the steps of:

fixing of the at least one organ, the part thereof, or the connection between the organs at at least a first point;

maintaining the fixing by further fixing the at least one organ, the part thereof, or the connection between the organs with the at least one organ, the part thereof, or the connection between the organs in a predetermined position relative to the first point of fixing; and releasing the fixing at the first point of fixing.

* * * * *